US007619765B2

(12) United States Patent
Kimura et al.

(10) Patent No.: US 7,619,765 B2
(45) Date of Patent: Nov. 17, 2009

(54) CLIENT SERVER SYSTEM, INFORMATION PROCESSING APPARATUS AND CONTROL METHOD THEREFOR, AND PROGRAM FOR EXECUTING THE CONTROL METHOD

(75) Inventors: Yoshio Kimura, Kanagawa (JP); Eiji Hayashi, Tokyo (JP)

(73) Assignee: Canon Kabushiki Kaisha (JP)

( * ) Notice: Subject to any disclaimer, the term of this patent is extended or adjusted under 35 U.S.C. 154(b) by 953 days.

(21) Appl. No.: 10/900,077

(22) Filed: Jul. 27, 2004

(65) Prior Publication Data

US 2005/0060649 A1 Mar. 17, 2005

(30) Foreign Application Priority Data

Jul. 31, 2003 (JP) ............................ 2003-205050

(51) Int. Cl.
*G06F 15/00* (2006.01)
*G06K 1/00* (2006.01)

(52) U.S. Cl. .................. 358/1.15; 358/1.11; 358/1.13; 358/1.14; 358/1.16

(58) Field of Classification Search ............... 358/1.15, 358/1.11, 1.13, 1.14, 1.16; 710/10, 5, 8
See application file for complete search history.

(56) References Cited

U.S. PATENT DOCUMENTS 6,671,749 B2 * 12/2003 Williams et al. .............. 710/10
6,940,615 B1 * 9/2005 Shima ....................... 358/1.15
7,304,758 B2 * 12/2007 Ferlitsch .................... 358/1.15
2002/0083131 A1 6/2002 Machida
2002/0097427 A1 7/2002 Kazama et al.
2002/0097432 A1 * 7/2002 Kumashio .................. 358/1.15
2002/0129353 A1 * 9/2002 Williams et al. ............ 717/175
2004/0001217 A1 * 1/2004 Wu ........................... 358/1.15
2004/0190042 A1 * 9/2004 Ferlitsch et al. ............ 358/1.15

FOREIGN PATENT DOCUMENTS

JP 11-259256 A 9/1999
JP 2000-148425 A 5/2000
JP 2001-043050 A 2/2001
JP 2002-215342 A 8/2002
JP 2002-251347 A 9/2002
JP 2003-005933 A 1/2003
JP 2003-157174 A 5/2003

* cited by examiner

*Primary Examiner*—Edward L Coles
*Assistant Examiner*—Satwant K Singh
(74) *Attorney, Agent, or Firm*—Rossi, Kimms & McDowell LLP

(57) ABSTRACT

A client server system which enables the user of a client computer to obtain the optimum printing result only by designating desired print settings, and to perform printing according to common print settings even if printers are modified or a new printer is added on a network. A favorite display module displays a print setting designating screen relating a printer. A data sending and receiving module transmits the print settings designated on the print setting designating screen by a user and an ID of a client computer to a server. A data sending and receiving module receives a printer driver adapted to the printer and print setting information from the server. A favorite setting changing module changes print settings of the printer driver according to the print setting information sent from the server. A favorite setting completion display module indicates that the changing of the print settings has been completed.

29 Claims, 25 Drawing Sheets

CLIENT COMPUTER
FAVORITE SETTING PROCESSING MODULE
FAVORITE DISPLAY MODULE
FAVORITE SETTING COMPLETION DISPLAY MODULE
12
10
PRINTER DRIVER INSTALLING MODULE
13
11
14
FAVORITE PROCESSING MODULE
FAVORITE SETTING CHANGING MODULE
5
DATA SENDING AND RECEIVING MODULE
1
2
SERVER
DATA SENDING AND RECEIVING MODULE
6
FAVORITE SETTING PROCESSING MODULE
15
17
CLIENT INFORMATION STORAGE MODULE
FAVORITE-BY-FAVORITE OPTIMUM PRINTER SELECTING MODULE
16
18
FAVORITE CORRESPONDENCE SETTING SELECTING MODULE
PRINTER INFORMATION STORAGE MODULE
DRIVER-FOR-OPTIMUM PRINTER EXTRACTING MODULE
19

Figures 4A, 4B:
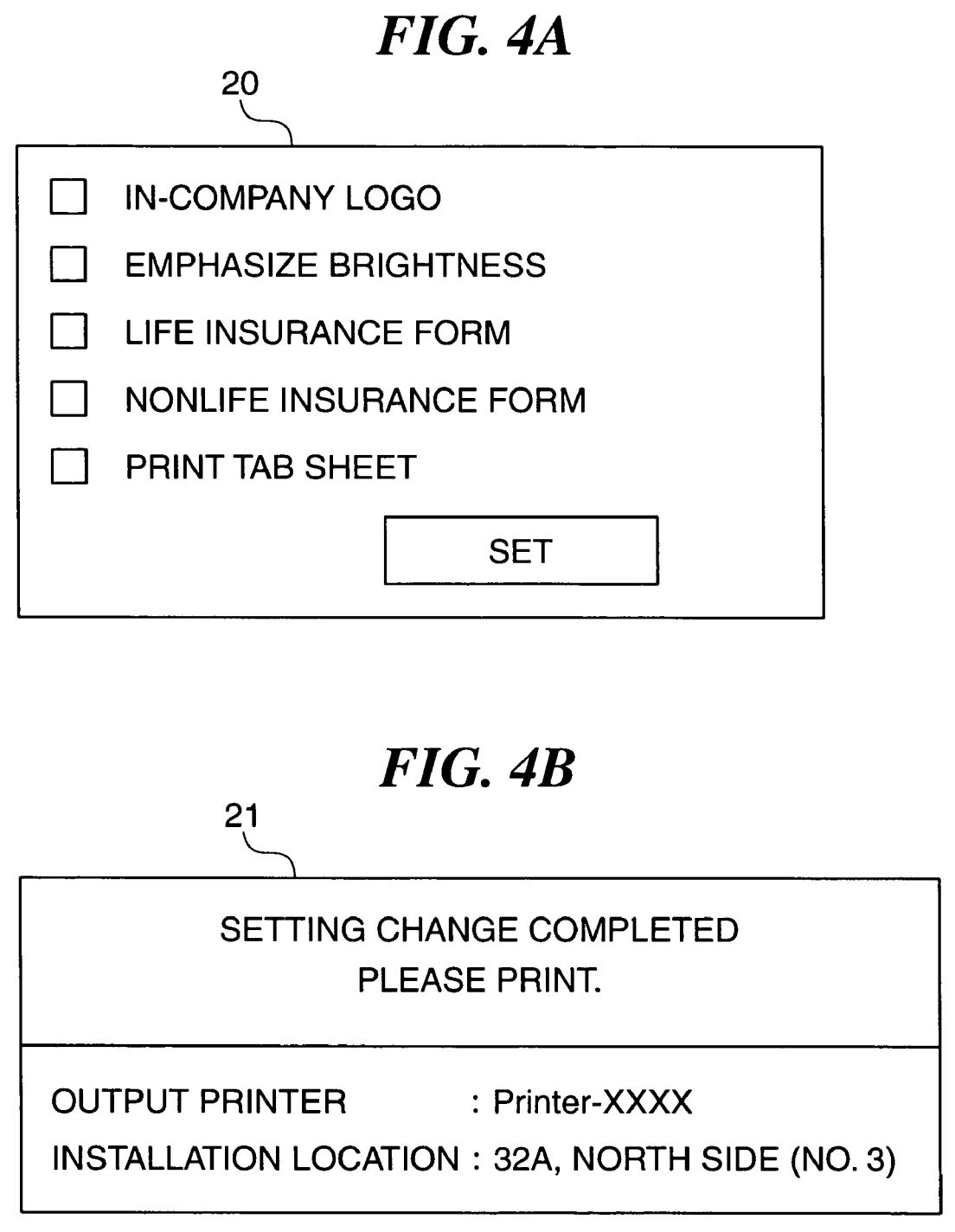

- [ ] IN-COMPANY LOGO
- [ ] EMPHASIZE BRIGHTNESS
- [ ] LIFE INSURANCE FORM
- [ ] NONLIFE INSURANCE FORM
- [ ] PRINT TAB SHEET

SET

SETTING CHANGE COMPLETED
PLEASE PRINT.

OUTPUT PRINTER : Printer-XXXX
INSTALLATION LOCATION : 32A, NORTH SIDE (NO. 3)

| PRINTER NAME | FAVORITE 1 | FAVORITE 2 | FAVORITE 3 | FAVORITE 4 | ... |
|---|---|---|---|---|---|
| XXX1 | 1 | 2 | 2 | 1 | ... |
| XXX2 | 2 | | 1 | 2 | ... |
| XXX3 | 3 | 1 | 3 | 3 | ... |
| ⋮ | ⋮ | ⋮ | ⋮ | ⋮ | |

| CLIENT 1 | USAGE | INSTALL |
|---|---|---|
| PRINTERXXX1 | PERMIT | INSTALLED |
| PRINTERXXX2 | NOT PERMIT | NOT INSTALLED |
| PRINTERXXX3 | PERMIT | NOT INSTALLED |
| ⋮ | ⋮ | ⋮ |

| PRINTER NAME | FAVORITE 1 | FAVORITE 2 | FAVORITE 3 | FAVORITE 4 | ... |
|---|---|---|---|---|---|
| XXX1 | FAVORITE SETTING FILE 1-1 | FAVORITE SETTING FILE 1-2 | FAVORITE SETTING FILE 1-3 | FAVORITE SETTING FILE 1-4 | ... |
| XXX2 | FAVORITE SETTING FILE 2-1 | | FAVORITE SETTING FILE 2-3 | FAVORITE SETTING FILE 2-4 | ... |
| XXX3 | FAVORITE SETTING FILE 3-1 | FAVORITE SETTING FILE 3-2 | FAVORITE SETTING FILE 3-3 | FAVORITE SETTING FILE 3-4 | ... |
| ... | ... | ... | ... | ... | |

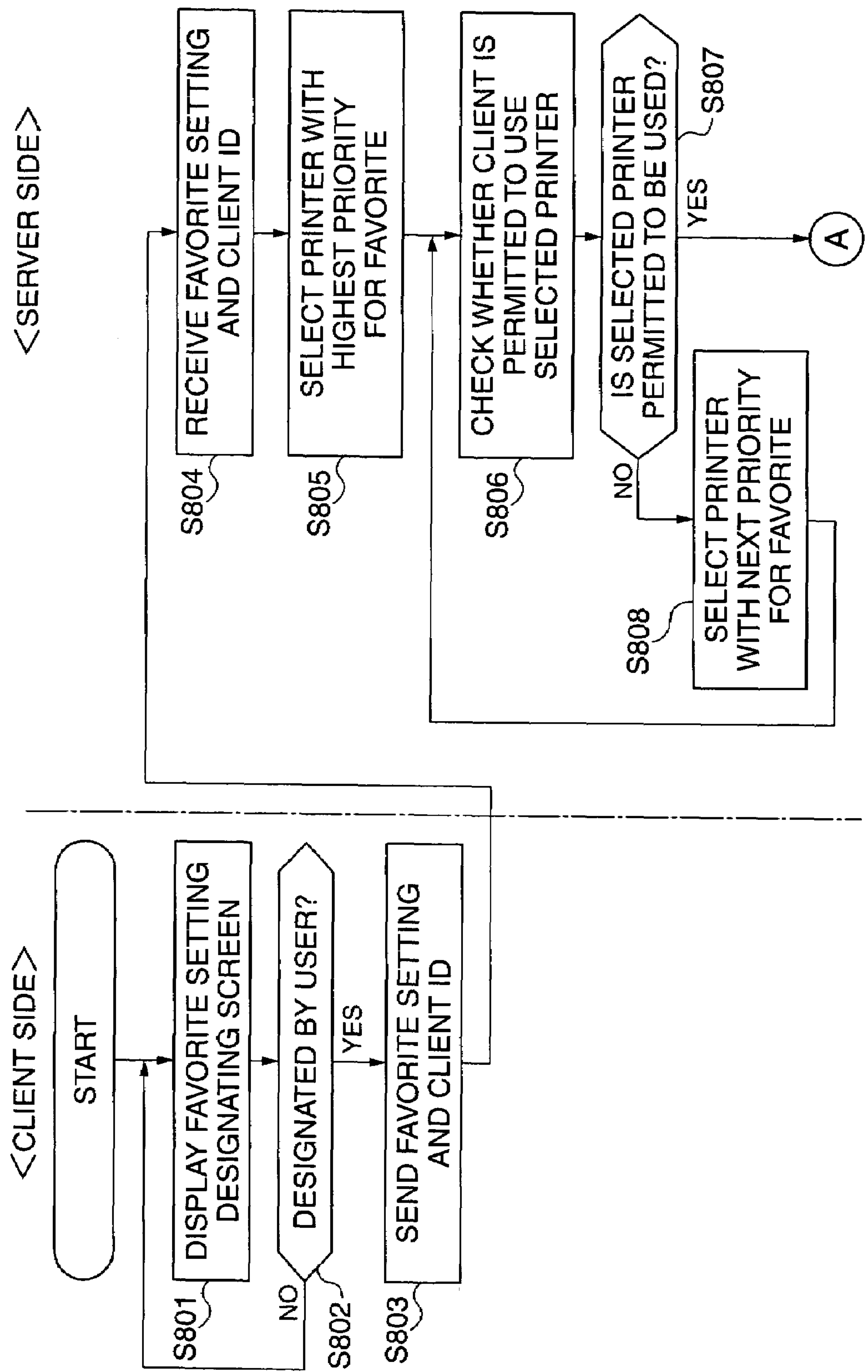
FIG. 8A
<CLIENT SIDE>
START
DISPLAY FAVORITE SETTING DESIGNATING SCREEN
S801
DESIGNATED BY USER?
S802
YES
NO
SEND FAVORITE SETTING AND CLIENT ID
S803
<SERVER SIDE>
RECEIVE FAVORITE SETTING AND CLIENT ID
S804
SELECT PRINTER WITH HIGHEST PRIORITY FOR FAVORITE
S805
CHECK WHETHER CLIENT IS PERMITTED TO USE SELECTED PRINTER
S806
IS SELECTED PRINTER PERMITTED TO BE USED?
S807
YES
NO
A
SELECT PRINTER WITH NEXT PRIORITY FOR FAVORITE
S808

A
S809
HAS PRINTER DRIVER BEEN INSTALLED?
YES
NO
S810
EXTRACT AND SEND PRINTER DRIVER FILE
S812
RECEIVE INSTALLATION COMPLETION NOTIFICATION
S813
ACQUIRE AND SEND FAVORITE SETTING FILE
S811
INSTALL PRINTER DRIVER
S814
CHANGE FAVORITE SETTING
S815
DISPLAY FAVORITE SETTING COMPLETION SCREEN
END

<SERVER SIDE>
<CLIENT SIDE>
START
S1801
DESIGNATE FAVORITE TO BE DOWNLOADED IN CLIENT
S1802
HAS DRIVER BEEN INSTALLED IN CLIENT?
YES
NO
S1803
SELECT PRINTER WITH HIGHEST PRIORITY FOR FAVORITE
S1804
IS SELECTED PRINTER PERMITTED TO BE USED?
YES
NO
S1805
SELECT PRINTER WITH NEXT PRIORITY FOR FAVORITE
B
C

B
C
S1806
EXTRACT AND SEND PRINTER DRIVER FILE
S1807
INSTALL PRINTER DRIVER
S1808
RECEIVE INSTALLATION COMPLETION NOTIFICATION
S1809
ACQUIRE AND SEND FAVORITE SETTING FILE
S1810
CHANGE FAVORITE SETTING
S1811
DISPLAY FAVORITE SETTING COMPLETION SCREEN
END

| PRINTER NAME | FAVORITE 1 | FAVORITE 2 | FAVORITE 3 | FAVORITE 4 | ... |
|---|---|---|---|---|---|
| XXX1 | 1 | 2 | 2 | 3 | ... |
| XXX2 | 2 | 3 | 1 | 2 | ... |
| XXX3 | 3 | 1 | | 1 | ... |
| ... | ... | ... | ... | ... | |

56

| CLIENT 1 | USAGE | INSTALL |
|---|---|---|
| PRINTERXXX1 | PERMIT | INSTALLED |
| PRINTERXXX2 | NOT PERMIT | NOT INSTALLED |
| PRINTERXXX3 | PERMIT | NOT INSTALLED |
| ⋮ | ⋮ | ⋮ |

| PRINTER NAME | FAVORITE 1 | FAVORITE 2 | FAVORITE 3 | FAVORITE 4 | ... |
|---|---|---|---|---|---|
| XXX1 | FAVORITE SETTING FILE 1-1 | FAVORITE SETTING FILE 1-2 | FAVORITE SETTING FILE 1-3 | FAVORITE SETTING FILE 1-4 | ... |
| XXX2 | FAVORITE SETTING FILE 2-1 | | FAVORITE SETTING FILE 2-3 | FAVORITE SETTING FILE 2-4 | ... |
| XXX3 | FAVORITE SETTING FILE 3-1 | FAVORITE SETTING FILE 3-2 | | FAVORITE SETTING FILE 3-4 | ... |
| ⋮ | ⋮ | ⋮ | ⋮ | ⋮ | |

CLIENT SERVER SYSTEM, INFORMATION PROCESSING APPARATUS AND CONTROL METHOD THEREFOR, AND PROGRAM FOR EXECUTING THE CONTROL METHOD

BACKGROUND OF THE INVENTION

1. Field of the Invention

The present invention relates to a client server system, an information processing apparatus and a control method therefor, and a program for implementing the control method, and more particularly to a client server system in which one or a plurality of printers, for example, are shared, an information processing apparatus and a control method therefor, and a program for implementing the control method.

2. Description of the Related Art

Conventionally, there has been a client server system in which a server, a plurality of client computers, and one or a plurality of printing apparatuses (printers) are connected to each other via a network, and the plurality of client computers share the one or plurality of printers.

In this client server system, favorite settings designated by users of the client computers in printing are those which have been provided for respective models of printers when printer drivers are installed, or those which have been changed using user interfaces of printer drivers.

Further, in the conventional client server system, a user has to designate which one is to be used among the plurality of printers shared on the network.

However, in the conventional client server system, it is difficult for an ordinary user to select the optimum printer by understanding e.g. the characteristics of all the printers shared on the network, and what kind of printing can be performed.

Moreover, to obtain the optimum output in printing, it is necessary to change print settings using a user interface of a printer driver, as required, but the user interface varies according to the printers, and therefore, it is more difficult for the user to understand print settings of printer drivers on all the printers shared on the network.

For the reasons stated above, it is difficult for the user to always select the optimum printer from among all the printers shared on the network, and to perform printing in the optimum way according to the optimum print settings.

On the other hand, it is impossible for a server administrator (system administrator) who installs and manages printers to restrict print settings which may be changed by users, because printer drivers are usually supplied from e.g. printer manufacturers.

Also, in client server systems used in large companies, usually server administrators install and manage printers, and hence there may be a case where common print settings are desired to be collectively distributed to all of client computers shared on a network, and a case where printers to be used for output are desired to be limited.

SUMMARY OF THE INVENTION

It is an object of the present invention to provide a client server system and an information processing apparatus and a control method therefor, which enable the user of a client computer to obtain the optimum printing result only by designating desired print settings and to perform printing according to common print settings even if printing apparatuses on a network are changed or a new printer is added on the network, as well as a program for implementing the control method.

To attain the above object, in a first aspect of the present invention, there is provided an information processing apparatus that is connected to a server which centrally manages information resources and at least one printing apparatus via a network, for using the information resources stored in the server, comprising a first display device that displays a print setting designating screen relating to the printing apparatus, a transmitting device that transmits print settings designated on the print setting designating screen by a user and an ID of the information processing apparatus to the server, a receiving device that receives a printer driver adapted to the printing apparatus and print setting information transmitted from the server, an installing device that installs the received printer driver, a changing device that changes print settings of the printer driver according to the received print setting information, and a second display device that displays an indication of completion of the change of the print settings.

According to the first aspect of the present invention, it is possible for a user to obtain the optimum printing result only by designating desired print settings, and to perform printing according to common print settings even if printing apparatuses are modified or a new printer is added on the network.

Preferably, the information processing apparatus comprises a creating and editing device that creates and edits contents of print settings to be displayed on the print setting designating screen.

Preferably, the installing device installs the printer driver according to installation information and an installation program transmitted from the server, and the first display device refers to the installation information to acquire and display configuration information relating to the printing apparatus.

More preferably, the configuration information includes information on an optional device attached to the printing apparatus.

To attain the above object, in a second aspect of the present invention, an information processing apparatus that is connected to at least one client computer that uses information resources and at least one printing apparatus via a network, for centrally managing the information resources, comprising a first information storage device that stores information relating to the client computer as first information, a second information storage device that stores information relating to the printing apparatus as second information, a selecting device that selects an optimum printing apparatus for use in printing from the second information according to print settings transmitted from the client computer and an ID of the client computer, a determining device that determines whether a printer driver adapted to the selected printing apparatus has been installed in the client computer according to the first information, a first transmitting device that transmits the printer driver to the client computer when the printer driver has not been installed in the client computer, an acquiring device that acquires print setting information adapted to the selected printing apparatus, and a second transmitting device that transmits the acquired print setting information to the client computer.

According to the present invention, it is possible for a server administrator has only to designate a desired client computer and print settings to make desired print settings for the client computer and restrict printers for use in output.

Preferably, the information processing apparatus comprises a first information acquiring device that acquires the first information from the client computer in advance.

Preferably, the information processing apparatus comprises a first information acquiring device that acquires the first information from the client computer when printing is carried out by the printing apparatus.

Preferably, the information processing apparatus comprises a second information acquiring device that acquires the second information from the printing apparatus in advance.

Preferably, the information processing apparatus comprises a second information acquiring device that acquires the second information from the printing apparatus in printing.

Preferably, the selecting device selects the optimum printing apparatus according to a predetermined order of priority of a plurality of printing apparatuses as the printing apparatus or usage conditions of the printing apparatus.

Preferably, the first transmitting device transmits the printer driver from another apparatus.

Preferably, the information processing apparatus comprises a creating device that creates installation information relating to the printer driver and an installation program, the installation program including configuration information on the printing apparatus.

More preferably, the configuration information includes contents of an optional device attached to the printing apparatus.

To attain the above object, in a third aspect of the present invention, there is provided a method of controlling an information processing apparatus that is connected to a server which centrally manages information resources and at least one printing apparatus via a network, for using the information resources stored in the server, comprising a first display step of displaying a print setting designating screen relating to the printing apparatus, a transmitting step of transmitting print settings designated on the print setting designating screen by a user and an ID of the information processing apparatus to the server, a receiving step of receiving a printer driver adapted to the printing apparatus and print setting information transmitted from the server, an installing step of installing the received printer driver, a changing step of changing print settings of the printer driver according to the received print setting information, and a second display step of displaying an indication of completion of the change of the print settings.

Preferably, the information processing method comprises a creating and editing step of creating and editing contents of print settings to be displayed on the print setting designating screen.

Preferably, the installing step comprises installing the printer driver according to installation information and an installation program transmitted from the server, and the first display step comprises referring to the installation information to acquire and display configuration information relating to the printing apparatus.

More preferably, the configuration information includes information on an optional device attached to the printing apparatus.

Preferably, a program for displaying the print setting designating screen relating to the printing apparatus in the first display step is provided from the server when printing is carried out by the printing apparatus.

To attain the above object, in a fourth aspect of the present invention, there is provided a method of controlling an information processing apparatus that is connected to at least one client computer that uses information resources and at least one printing apparatus via a network, for centrally managing the information resources, comprising a first information storage step of storing information relating to the client computer as first information, a second information storage step of storing information relating to the printing apparatus as second information, a selecting step of selecting an optimum printing apparatus for use in printing from the second information according to print settings transmitted from the client computer and an ID of the client computer, a determining step of determining whether a printer driver adapted to the selected printing apparatus has been installed in the client computer according to the first information, a first transmitting step of transmitting the printer driver to the client computer when the printer driver has not been installed in the client computer, an acquiring step of acquiring print setting information adapted to the selected printing apparatus, and a second transmitting step of transmitting the acquired print setting information to the client computer.

Preferably, the information processing method comprises a first information acquiring step of acquiring the first information from the client computer in advance.

Preferably, the information processing method comprises a first information acquiring step of acquiring the first information from the client computer in printing.

Preferably, the information processing method comprises a second information acquiring step of acquiring the second information from the printing apparatus in advance.

Preferably, the information processing method comprises a second information acquiring step of acquiring the second information from the printing apparatus in printing.

Preferably, the selecting step comprises selecting the optimum printing apparatus according to a predetermined order of priority of a plurality of printing apparatuses as the printing apparatus or usage conditions of the printing apparatus.

Preferably, the first transmitting step comprises transmitting the printer driver from another apparatus.

Preferably, the information processing method comprises a creating step of creating installation information relating to the printer driver and an installation program, the installation program including configuration information on the printing apparatus.

More preferably, the configuration information includes contents of an optional device attached to the printing apparatus.

To attain the above object, in a fifth aspect of the present invention, there is provided a program for causing a computer to execute a method of controlling an information processing apparatus that is connected to a server which centrally manages information resources and at least one printing apparatus via a network, for using the information resources stored in the server, comprising a first display module for displaying a print setting designating screen relating to the printing apparatus, a transmitting module for transmitting print settings designated on the print setting designating screen by a user and an ID of the information processing apparatus to the server, a receiving module for receiving a printer driver adapted to the printing apparatus and print setting information transmitted from the server, an installing module for installing the received printer driver, a changing module for changing print settings of the printer driver according to the received print setting information, and a second display module for displaying an indication of completion of the change of the print settings.

To attain the above object, in a sixth aspect of the present invention, there is provided a program for causing a computer to execute a method of controlling an information processing apparatus that is connected to at least one client computer that uses information resources and at least one printing apparatus via a network, for centrally managing the information resources, comprising a first information storage module for storing information relating to the client computer as first information, a second information storage module for storing information relating to the printing apparatus as second information, a selecting module for selecting an optimum printing apparatus for use in printing from the second information according to print settings transmitted from the client computer and an ID of the client computer, a determining module for determining whether a printer driver adapted to the selected printing apparatus has been installed in the client computer according to the first information, a first transmitting module for transmitting the printer driver to the client computer when the printer driver has not been installed in the client computer, an acquiring module for acquiring print setting information adapted to the selected printing apparatus, and a second transmitting module for transmitting the acquired print setting information to the client computer.

To attain the above object, in a seventh aspect of the present invention, there is provided a client server system in which a server centrally managing information resources, at least one client that uses the information resources stored in the server and at least one printing apparatus are connected to each other via a network, the client comprising a display device that displays a print setting designating screen relating to the printing apparatus, a first transmitting device that transmits print settings designated on the print setting designating screen by a user and an ID of the client to the server, and a changing device that changes print settings of the printer driver according to print setting information transmitted from the server, and the server comprising a first information storage device that stores information relating to the client as first information, a second information storage device that stores information relating to the printing apparatus as second information, a selecting device that selects an optimum printing apparatus for use in printing from the second information according to print settings transmitted from the client and the ID of the client, an acquiring device that acquires print setting information adapted to the selected printing apparatus, and a second transmitting device that transmits the acquired print setting information to the client.

According to the present invention, even if a new printing apparatus is added on the network, a required printer driver can be installed in a client computer without intervention of a user, and the added printing apparatus can be immediately used since it is unnecessary to makes settings for the installed printer driver.

To attain the above object, in an eighth aspect of the present invention, there is provided an information processing apparatus that is connected to at least one client computer that uses information resources and at least one printing apparatus via a network, for centrally managing the information resources, comprising a display device that displays a print setting downloading screen for downloading print settings of the printing apparatus, a first information storage device that stores information relating to the client computer as first information, a second information storage device that stores information relating to the printing apparatus as second information, a determining device that determines whether a printer driver has been installed in the client computer selected on the print setting downloading screen according to the first information, a selecting device that selects an optimum printing apparatus for use in printing by the client computer from the second information when the printer driver has not been installed in the client computer, a first transmitting device that transmits the printer driver of the selected printing apparatus to the client computer, a notifying device that notifies completion of installation of the printer driver after the installation of the printer driver for the selected printing apparatus has been completed, and a second transmitting device that acquires print setting information adapted to the selected printing apparatus, and transmits the acquired print setting information to the client computer.

To attain the above object, in a ninth aspect of the present invention, there is provided an information processing apparatus that is connected to a server which centrally manages information resources and at least one printing apparatus via a network, for using the information resources stored in the server, comprising a changing device that changes print settings of the printer driver according to print setting information transmitted from the server, and a display device that displays an indication of completion of the change of the print settings.

To attain the above object, in a tenth aspect of the present invention, there is provided a method of controlling an information processing apparatus that is connected to at least one client computer that uses information resources and at least one printing apparatus via a network, for centrally managing the information resources, comprising a display step of displaying a print setting downloading screen for downloading print settings of the printing apparatus, a first information storage step of storing information relating to the client computer as first information, a second information storage step of storing information relating to the printing apparatus as second information, a determining step of determining whether a printer driver has been installed in the client computer selected on the print setting downloading screen according to the first information, a selecting step of selecting an optimum printing apparatus for use in printing by the client computer from the second information when the printer driver has not been installed in the client computer, a first transmitting step of transmitting the printer driver of the selected printing apparatus to the client computer, a notifying step of notifying completion of installation of the printer driver after the installation of the printer driver for the selected printing apparatus has been completed, and a second transmitting step of acquiring print setting information adapted to the selected printing apparatus, and transmitting the acquired print setting information to the client computer.

To attain the above object, in an eleventh aspect of the present invention, there is provided a method of controlling an information processing apparatus that is connected to a server which centrally manages information resources and at least one printing apparatus via a network, for using the information resources stored in the server, comprising a changing step of changing print settings of the printer driver according to print setting information transmitted from the server, and a display step of displaying an indication of completion of the change of the print settings.

To attain the above object, in a twelfth aspect of the present invention, there is provided a program for causing a computer to execute a method of controlling an information processing apparatus that is connected to at least one client computer that uses information resources and at least one printing apparatus via a network, for centrally managing the information resources, comprising a display module for displaying a print setting downloading screen for downloading print settings of the printing apparatus, a first information storage module for storing information relating to the client computer as first information, a second information storage module for storing information relating to the printing apparatus as second information, a determining module for determining whether a printer driver has been installed in the client computer selected on the print setting downloading screen according to the first information, a selecting module for selecting an optimum printing apparatus for use in printing by the client computer from the second information when the printer driver has not been installed in the client computer, a first transmitting module for transmitting the printer driver of the selected printing apparatus to the client computer, a notifying module for notifying completion of installation of the printer driver after the installation of the printer driver for the selected printing apparatus has been completed, and a second transmitting module for acquiring print setting information adapted to the selected printing apparatus, and transmitting the acquired print setting information to the client computer.

To attain the above object, in a thirteenth aspect of the present invention, there is provided a program for causing a computer to execute a method of controlling an information processing apparatus that is connected to a server which centrally manages information resources and at least one printing apparatus via a network, for using the information resources stored in the server, comprising a changing module for changing print settings of the printer driver according to print setting information transmitted from the server, and a display module for displaying an indication of completion of the change of the print settings.

The above and other objects, features, and advantages of the invention will become more apparent from the following detailed description taken in conjunction with the accompanying drawings.

BRIEF DESCRIPTION OF THE DRAWINGS

FIGS. 4A and 4B are views showing examples of display screens displayed in the client computer 1, in which FIG. 4A shows a favorite setting screen, and FIG. 4B is a favorite setting completion screen;

FIG. 5 is a diagram showing the details of printer information stored by a printer information storage module 15 appearing in FIG. 3;

FIG. 7 is a diagram showing the details of a favorite setting file relationship table used by a favorite correspondence setting selecting module 18 appearing in FIG. 3;

FIGS. 8A and 8B are flow chart showing a favorite setting process carried out in the client server system in FIG. 1;

FIG. 24 is a diagram showing the details of a favorite setting file table in the client server system.

DETAILED DESCRIPTION OF THE PREFERRED EMBODIMENTS

The present invention will now be described in detail with reference to the drawings showing preferred embodiments thereof.

Figure 1:
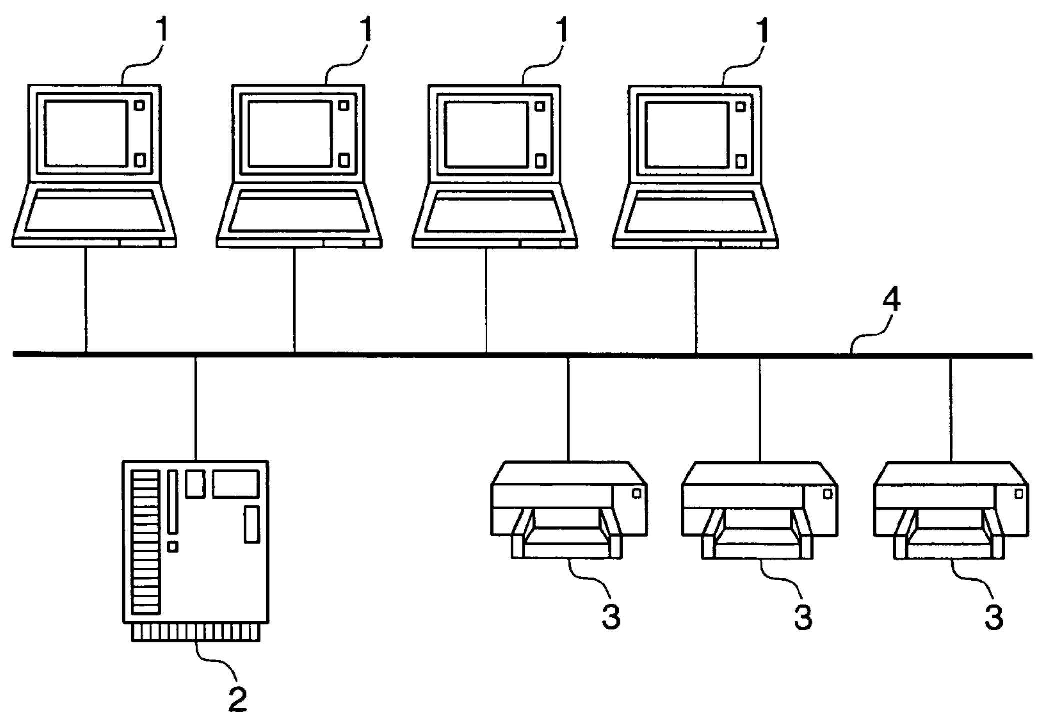
FIG. 1 is a view schematically showing the entire construction of a client server system according to a first embodiment of the present invention.

FIG. 1 is a view schematically showing the entire construction of a client server system according to a first embodiment of the present invention.

As shown in FIG. 1, the client server system is comprised of an information processing apparatus (hereinafter referred to as "the server") 2 which centrally manages information resources, a plurality of information processing apparatuses (hereinafter referred to as "the client computer(s)") 1 capable of using the information resources stored in the server 2, and a plurality of printers 3. The server 2, the client computers 1, and the printers 3 are connected to each other via a network 4 such as a LAN (Local Area Network).

It is assumed that the client computers 1 are used even by ordinary users who have no particular knowledge about printer capabilities, printer drivers, and so forth. On the other hand, it is assumed that the server 2 is used by a server administrator (system administrator) who is familiar with printer capabilities, printer drivers, and so forth. The printers 3 are implemented by laser printers and/or inkjet printers capable of being connected to the network 4.

Figure 2:
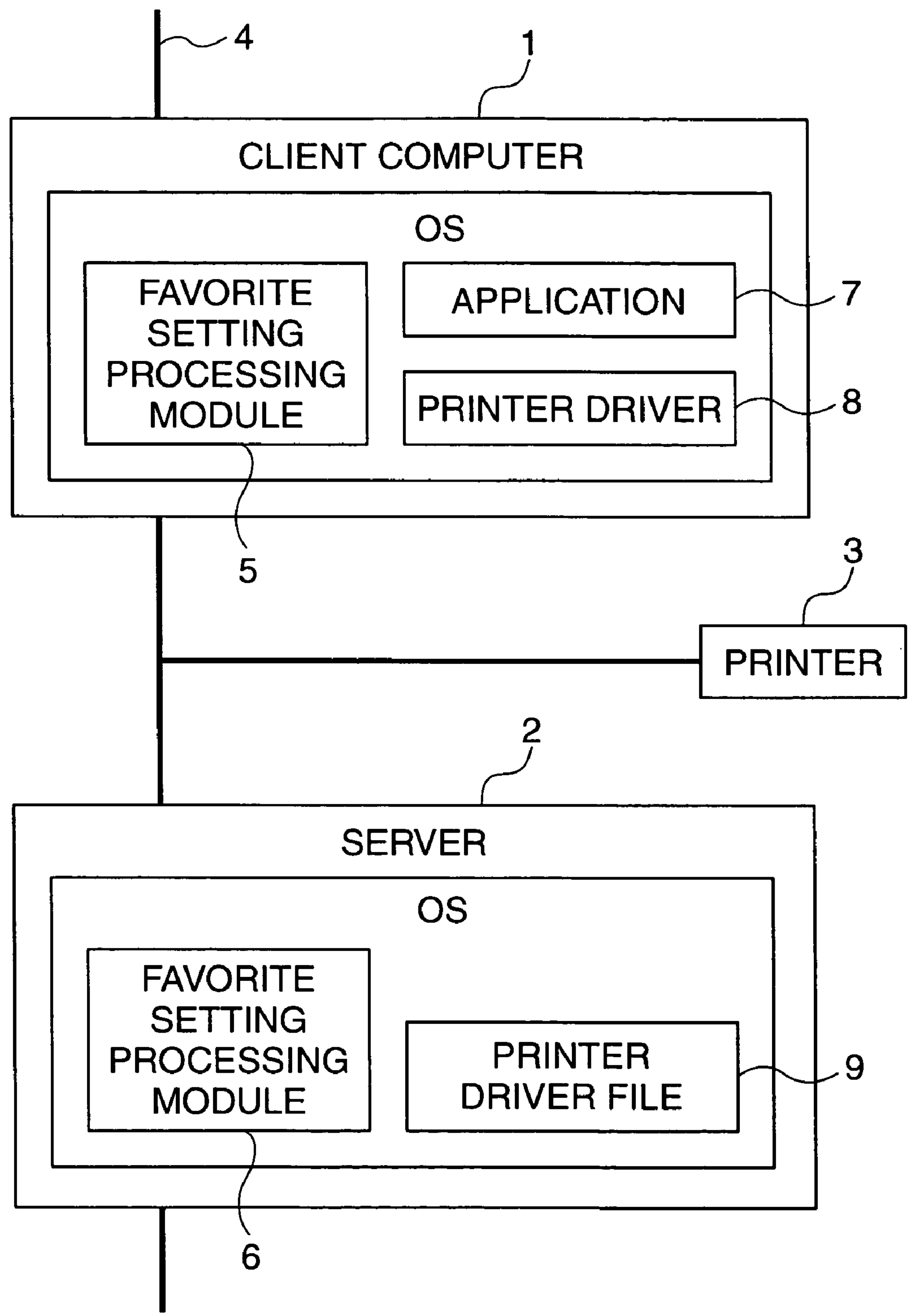
FIG. 2 is a block diagram showing the software configuration of client computers 1 and a server 2 appearing in FIG. 1.

FIG. 2 is a block diagram showing the software configurations of the client computers 1 and the server 2 appearing in FIG. 1. It is assumed that the plurality of client computers 1 has substantially the same software configuration, and in the following description they will be referred to as the client computer 1.

As shown in FIG. 2, the client computer 1 includes a favorite setting processing module 5, an application 7, and a printer driver 8, which are programs operating on an OS (Operating System) installed in advance in the client computer 1.

The server 2 includes a favorite setting processing module 6 and a printer driver file 9. The favorite setting processing module 6 is a program operating on an OS installed in advance in the server 2.

The application 7 is an arbitrary application program used on the client computer 1, and is used e.g. when a user creates data to be printed. The printer driver 8 is for controlling the printer 3 connected to the network 4. The printer driver 8 is installed in the client computer 1 before printing or in printing. Only one type of printer driver 8 should not necessarily be installed, but a plurality of types of printer drivers 8 may be installed.

The printer driver file 9 contains printer drivers as files for controlling the printers 3 connected to the network 4. It should be noted that the printer driver file 9 is usually stored in the server 2, but this is not limitative. In the case where the printer driver file 9 is not stored in the server 2, the server 2 has to manage and store information on another apparatus which stores the printer driver file 9.

Figure 3:
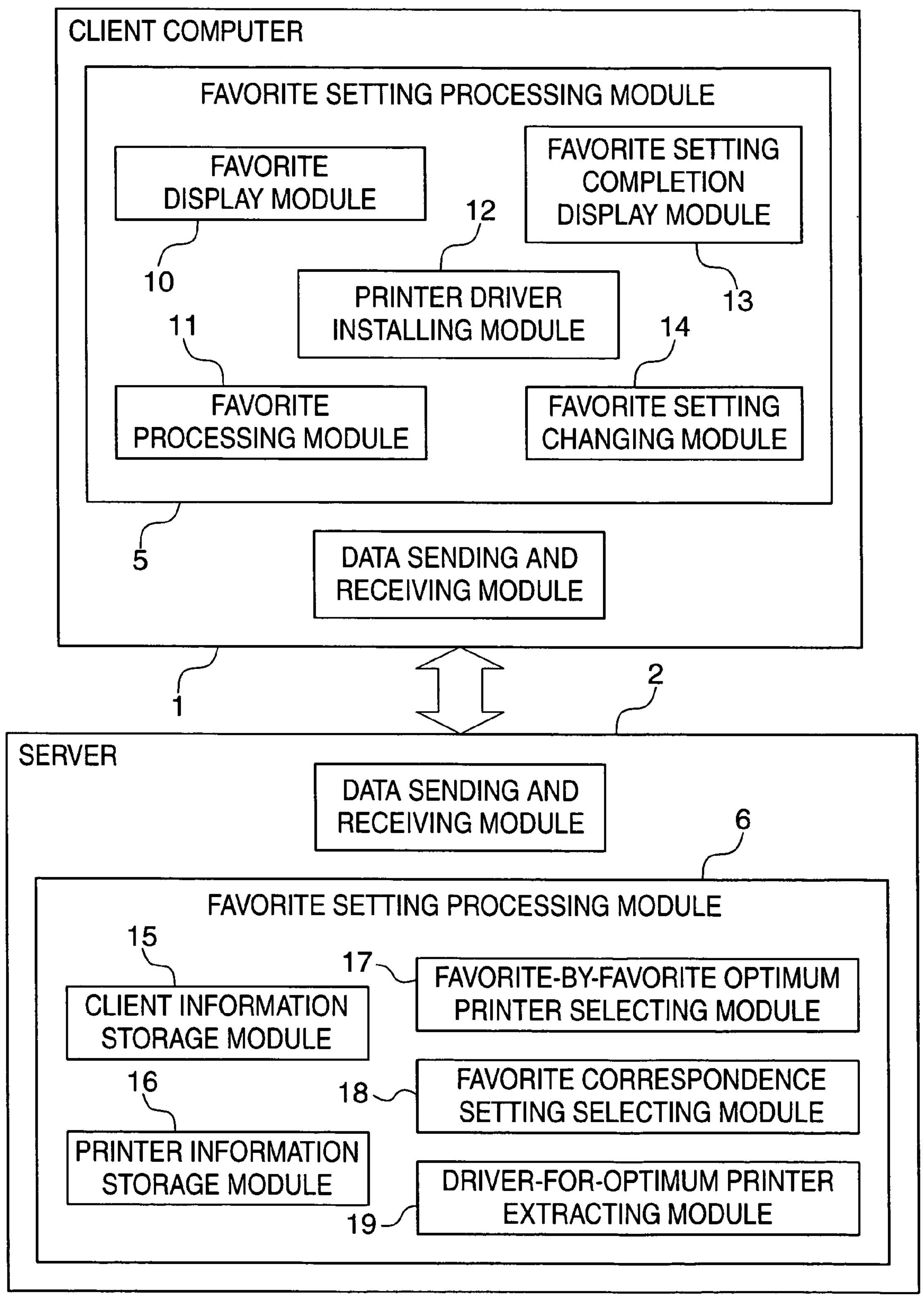
FIG. 3 is a block diagram showing the software configurations of favorite setting processing modules 5 and 6 appearing in FIG. 2.

FIG. 3 is a block diagram showing the software configurations of the favorite setting processing modules 5 and 6 appearing in FIG. 2.

As shown in FIG. 3, the favorite setting processing module 5 is comprised of a favorite display module 10, a favorite processing module 11, a printer driver installing module 12, a favorite setting completion display module 13, and a favorite setting changing module 14, which are programs operating on the client computer 1.

The favorite setting processing module 6 is comprised of a client information storage module 15, a printer information storage module 16, a favorite-by-favorite optimum printer selecting module 17, a favorite correspondence setting selecting module 18, and a driver-for-optimum printer extracting module 19, which are programs operating on the server 2.

The favorite display module 10 is a program for displaying a common favorite setting designating screen (print setting designating screen), described later, on a display, not shown, of the client computer 1 irrespective of the presence and type of the printer driver 8 installed in the client computer 1, and is used for printing data created according to the application 7 by the user of the client computer 1.

When the user of a predetermined client computer 1 designates desired favorite settings from among a plurality of favorite settings (print settings) on the favorite setting designating screen displayed on the display of the client computer 1, the designated favorite setting and an ID of the client computer 1 (client ID) are sent to the server 2 via a data sending and receiving module by the favorite processing module 11. In general, client IDs are uniquely set for respective client computers, but may be uniquely set for respective users in the case where a plurality of users shares one client computer.

In the server 2, when a data sending and receiving module receives the favorite setting and the client ID from the client computer 1, client information (first information) stored in a storage device, not shown, such as a hard disk by the client information storage module 15 is selected according to the client ID, and the favorite-by-favorite optimum printer selecting module 17 selects the optimum printer 3 from printer information (second information) stored in the storage device according to the client information and the favorite setting by the printer information storage module 16.

In the case where a printer driver adapted to the printer 3 selected by the favorite-by-favorite optimum printer selecting module 17 has not been installed in the client computer 1, the driver-for-optimum printer extracting module 19 extracts the printer driver from the printer driver file 9, and sends the same to the client computer 1. Whether or not the printer driver has already been installed in the client computer 1 is determined according to the client information selected by the client information storage module 15. Here, the client information includes information indicative of the type of the printer driver installed in the client computer 1.

When the client computer 1 receives the printer driver from the server 2, the driver installing module 12 installs the printer driver in the client computer 1.

The favorite correspondence setting selecting module 18 acquires the optimum favorite setting file (print setting information), which corresponds to the favorite settings designated by the user and is adapted to the printer 3 selected by the favorite-by-favorite optimum printer selecting module 17, from a favorite setting file table, described later, and sends the acquired favorite setting file to the client computer 1. Favorite setting files depend on respective types of printer drivers, and are stored in advance in the server 2.

The favorite setting files are pieces of information which can be set in printer drivers, and in other words, are multiple settings relating to printing as a unit of a plurality of print settings. Examples of print settings which can be set by the user include finishing settings as to e.g. sheet size, stapling, whether punching is to be performed or not, double-sided/one-sided printing, sheet discharge port, and sheet feed port, and various kinds of settings as to e.g. print quality such as the resolution of image formation, manual feed setting, and the usage of a secret stamp for a background. The user designates desired settings from among the above, and the designated settings are collected into a favorite setting file. The favorite setting file can be stored in a file system of the server 2 or the client 1.

The user opens a user interface of the printer driver and depresses a reading instruction button to give an instruction for reading the favorite setting file, whereby the favorite settings are input to the printer driver, to cause the printer driver to recognize the favorite settings. An installation program called SDK can control the printer driver such that the printer driver automatically reads the favorite settings. The SDK may control a process in which the printer driver reads the favorite setting file via the OS. The printer driver recognizes the contents of the input favorite setting file, and carries out image formation according to the recognized contents.

When the client computer 1 receives the favorite setting file from the server 2, the favorite setting changing module 14 changes favorite settings (print settings) of the installed printer driver. Upon completion of the change, the favorite setting completion display module 13 indicates that the selection of the optimum printer for the user and the change of the optimum favorite setting have been completed. Thereafter, the user has only to depress a print button or the like to cause the optimum printer to perform printing on arbitrary print data according to the optimum favorite settings.

FIGS. 4A and 4B are views showing examples of screens displayed in the client computer 1, in which FIG. 4A shows a favorite setting designating screen, and FIG. 4B shows a favorite setting completion screen.

The favorite setting designating screen 20 in FIG. 4A is displayed by the favorite display module 10 as described above. A plurality of favorite settings are displayed on the favorite setting designating screen 20. The user designates desired favorite settings, and checks off the corresponding check boxes.

The server 2 includes a favorite setting designating screen creating/editing module, not shown, which enables the server administrator to freely create and edit the contents of the favorite settings displayed on the favorite setting designating screen 20. The user can use a user interface common to a plurality of client computers, and easily designate favorite settings irrespective of what kind of printer driver or the like has been installed in his/her client computer.

The favorite setting completion screen 21 in FIG. 4B is displayed by the favorite setting completion display module 13. Here, the favorite setting completion screen 21 indicates the model name and installation location of a printer which is actually selected, as well as the completion of favorite settings.

FIG. 5 is a diagram showing the details of the printer information stored by the printer information storage module 16 appearing in FIG. 3.

As shown in FIG. 5, the printer information 22 contains the order of priority of the plurality of printers 3 for the respective favorite settings displayed on the favorite setting designating screen 20. The optimum printer 3 is selected from among the plurality of printers 3 on the network 4 according to the printer information 22. For example, if the user designates a “favorite 3”, a “printer XXX2” with a priority “1” for the “favorite 3” in the printer information 22 is selected. On this occasion, if the printer “XXX2” cannot be used for printing since it is in use or has broken down, a “printer XXX1” with a priority “2” is selected. It should be noted that a blank in FIG. 5 indicates that the concerned printer 3 is not adapted to an arbitrary favorite setting.

Figure 6:
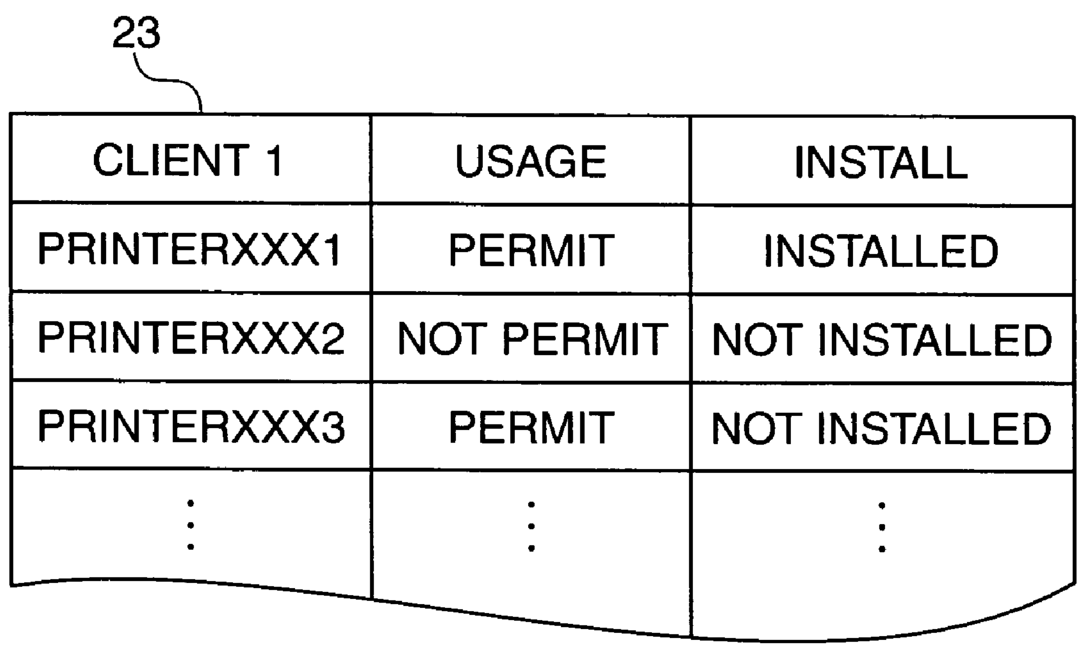
FIG. 6 is a diagram showing the details of client information stored by a client information storage module 16 appearing in FIG. 3.

FIG. 6 is a view showing the details of the client information stored by the client information storage module 15.

As shown in FIG. 6, the client information 23 contains adaptability information on the plurality of printers 3 for a predetermined client computer 1. In FIG. 6, the word “permit” means that the predetermined client computer 1 can use a concerned printer 3, and the words “not permit” mean that the predetermined client computer 1 cannot use a concerned printer 3. For example, a “client 1” can use a “printer XXX1” and a “printer XXX3”, but cannot use a “printer XXX2”.

Also, the client information 23 is associated with information indicative of whether a printer driver has been installed in the client computer 1.

In this way, whether or not a printer 3 selected according to the printer information 22 can be used by a predetermined client computer 1 is determined according to the client information 23 selected according to a client ID. If it is determined that the printer 3 can be used by the client computer 1, it is determined whether or not a printer driver has already been installed in the client computer 1. If it is determined that the printer 3 cannot be used by the client computer 1, a printer 3 with the next highest priority is selected according to the printer information 22, and it is determined again whether or not the selected printer 3 can be used by the predetermined client computer 1. It should be noted that the number of pieces of the client information 23 corresponds to the number of client computers 1 connected to the network 4.

FIG. 7 is a view showing the details of the favorite setting file table used by the favorite correspondence setting selecting module 18 appearing in FIG. 3.

As shown in FIG. 7, the favorite setting file table 24 contains optimum favorite setting files adapted to the respective printers 3 for respective favorite settings. Here, the favorite setting files depend on printer drivers and OSs, and are stored in actual file format or in data format, for example.

To further change settings for client computers or groups of client computers, favorite setting file tables 24 may be prepared for the respective client computers or groups of the client computers. It should be noted that the selection of a printer 3 for use in printing and the installation of a printer driver have been completed at a time point the favorite correspondence setting selecting module 18 starts processing.

Figure 8B:
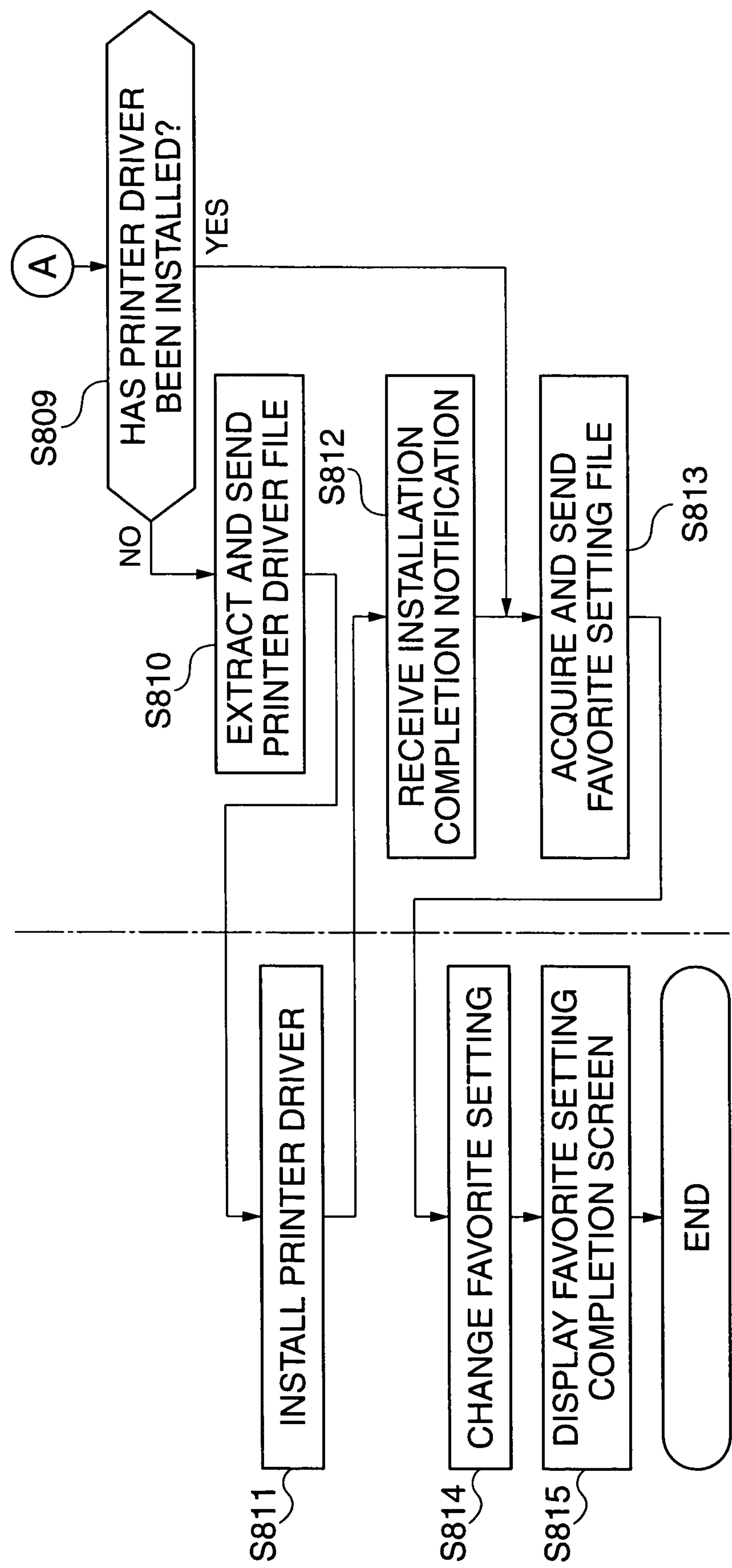

FIGS. 8A and 8B are flow chart showing a favorite setting process carried out in the client server system in FIG. 1.

In FIG. 8A, first, on the client side, to print data created according to the arbitrary application 7 by the user, the favorite setting designating screen 20 is displayed (step S801). Here, a program for displaying the favorite setting designating screen 20 is stored in advance in the client computer 1, but may be installed from another apparatus in printing.

Then, when the user designates a desired favorite setting on the displayed favorite setting designating screen 20 (“YES” to a step S802), the designated favorite setting and a client ID are sent to the server 2 (step S803).

On the server side, upon reception of the designated favorite setting and the client ID from the client computer 1 (step S804), the optimum printer 3, i.e. a printer 3 with the highest priority for the designated favorite setting is selected from the printers in the printer information 22 according to the printer information 22 and the favorite settings (step S805).

Then, whether or not the client computer 1 is permitted to use the selected computer 3 is checked according to the client information 23 (step S806) to determine whether or not the client computer 1 can use the selected printer 3 (step S807). If the determination result is negative (“NO” to the step S807), a printer 3 with the next highest priority is selected according to the printer information 22 (step S808), and the process returns to the step S806. On the other hand, if the determination result is positive (“YES” to the step S807), the process proceeds to a step S809. It should be noted that the step S806 is executed by the favorite-by-favorite optimum printer selecting module 17.

In the step S809, it is determined whether or not the printer driver has been installed in the client computer 1, and if the determination result is negative (“NO” to the step S809), the file of a printer driver adapted to the selected printer 3 is extracted from the printer driver file 9, and sent to the client computer 1 (step S810).

On the client side, upon reception of the file of the printer driver from the server 2, the printer driver is installed in the client computer 1, and upon completion of the installation, an installation completion notification is sent to the server 2 (step S811).

On the server side, upon reception of the installation completion notification from the client computer 1 (step S812), a favorite setting file which is adapted to the printer 3 selected in the step S805 and corresponds to the designated favorite setting received in the step S804 is acquired from the favorite setting file table 24 with the printer driver installed in the client computer 1, and is sent to the client computer 1 (step S813).

On the client side, settings (print settings) of the installed printer driver are changed according to the received favorite setting file (step S814), and a favorite setting completion screen is displayed (step S815), followed by termination of the process.

In the above process, in the case where the printer driver has not been installed in the client computer 1, the printer driver is installed in the client computer 1, but in an alternative form, the printer 3 may be prohibited from being used, and the steps S805 and S808 as well as the steps S809 to S812 may be omitted.

Further, in the above process, in the case where the printer driver adapted to the selected printer 3 has not been installed in the client computer 1, the printer driver is installed in the client computer 1, but the printer driver may be installed in advance in the client computer 1. In this case, the client computer 1 has to be provided with a driver-for-optimum printer extracting module in place of the printer driver installing module 12, whereas the server 2 does not have to be provided with the driver-for-optimum printer extracting module 19.

In the above described embodiment, the present invention is applied to a client server system in which one server 2, a plurality of client computers 1, and a plurality of printers 3 are connected to each other via a network 4, but may easily be applied to a system comprised of one client computer 1 or one printer 3.

Further, in the client server system according to the above described embodiment, the printers 3 are implemented by network printers which are directly connected to the network 4, but may be connected to the network 4 via computers (such as a print server) connected thereto. Also, the server 2 may also serve as a print server. Further, it goes without saying that the network 4 should not necessarily be implemented by a LAN, but may also be implemented by other networks. The client computers 1, the server 2, the printers 3, and so forth may be connected to the network 4 via wireless communication.

According to the above described first embodiment, the server 2 selects the optimum printer 3 according to a favorite setting designated on the favorite setting designating screen 20 and a client ID of the client computer 1, and installs the printer driver for the selected printer 3 as needed and changes favorite settings of the printer driver. As a result, the user of a client computer has only to designate desired print settings to obtain the optimum printing result, and even in the case where printing apparatuses on the network are changed or a new printing apparatus is added, printing can be performed according to common print settings.

Further, the system administrator does not have to teach the user about printers and printer drivers. Moreover, since the system administrator can restrict favorite settings, efficient supply of supplies such as sheets, ink, and toners as well as efficient provision of options attached to the printers 3 are possible.

A description will now be given of a second embodiment of the present invention.

Figure 9:
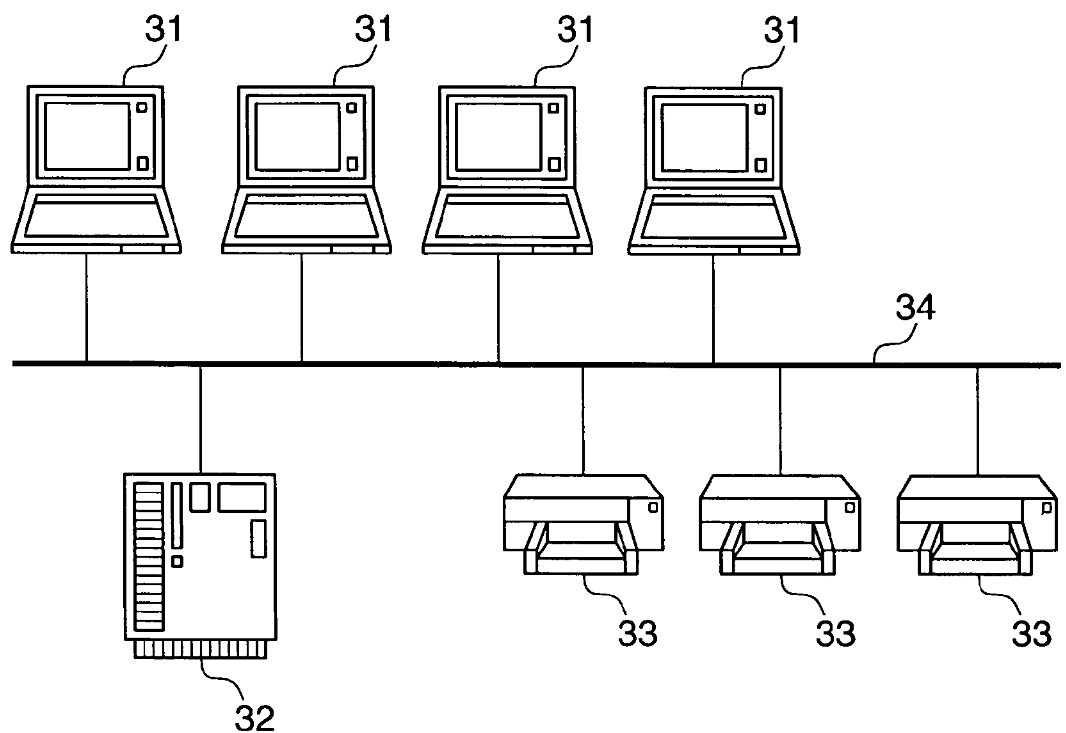
FIG. 9 is a view schematically showing the entire construction of a client server system according to a second embodiment of the present invention.

FIG. 9 is a view schematically showing the entire construction of a client server system according to the second embodiment.

As shown in FIG. 9, the client server system according to the present embodiment is comprised of a server 32 which centrally manages information resources, a plurality of client computers 31 which are capable of using the information resources stored in the server 32, and a plurality of printers 33. The server 32, the client computers 31, and the printers 33 are connected to each other via a network 34 such as a LAN (Local Area Network).

The client computers 31 are used by ordinary users who have no particular knowledge about printer capabilities, printer drivers, and so forth. On the other hand, the server 32 is intended to be used by a server administrator (system administrator) who is familiar with printer capabilities, printer drivers, and so forth. The printers 33 are implemented by laser printers and/or inkjet printers, which are capable of being connected to the network 34.

Figure 10:
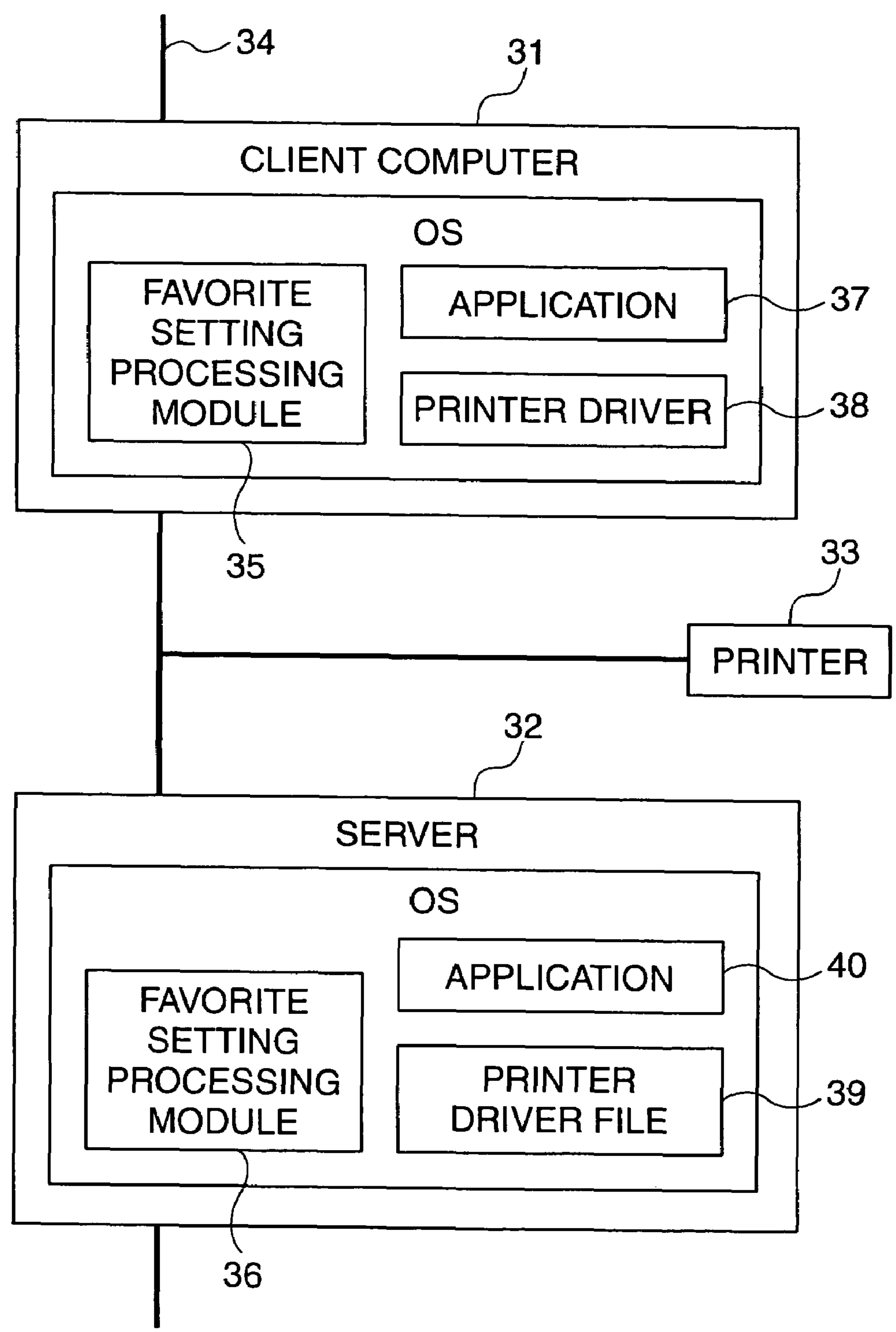
FIG. 10 is a block diagram showing the software configurations of client computers 31 and a server 32 appearing in FIG. 9.

FIG. 10 is a block diagram showing the software configuration of the client computer 31 and the server 32 appearing in FIG. 9. It is assumed that the plurality of client computers 31 has substantially the same software configuration, and in the following description they will be referred to as the client computer 31.

As shown in FIG. 10, the client computer 31 includes a favorite setting processing module 35, an application 37, and a printer driver 38, which are programs operating on an OS (Operating System) installed in advance in the client computer 31.

The server 32 includes a favorite setting processing module 36 and a printer driver file 39. The favorite setting processing module 36 is a program which operates on an OS installed in advance in the server 32.

The application 37 is an arbitrary application program used on the client computer 31, and is used e.g. when a user creates data to be printed. The printer driver 38 is for controlling the printer 33 connected to the network 34. The printer driver 38 is installed in the client computer 31 before printing or in printing. Only one type of printer driver 38 should not necessarily be installed, but a plurality of types of printer drivers 38 may be installed.

The printer driver file 39 contains printer drivers as files for controlling the printers 33 connected to the network 34. It should be noted that the printer driver file 39 is usually stored in the server 32, but this is not limitative. If the printer driver file 39 is not stored in the server 32, the server 32 has to manage and contain information on another apparatus which stores the printer driver file 39.

Figure 11:
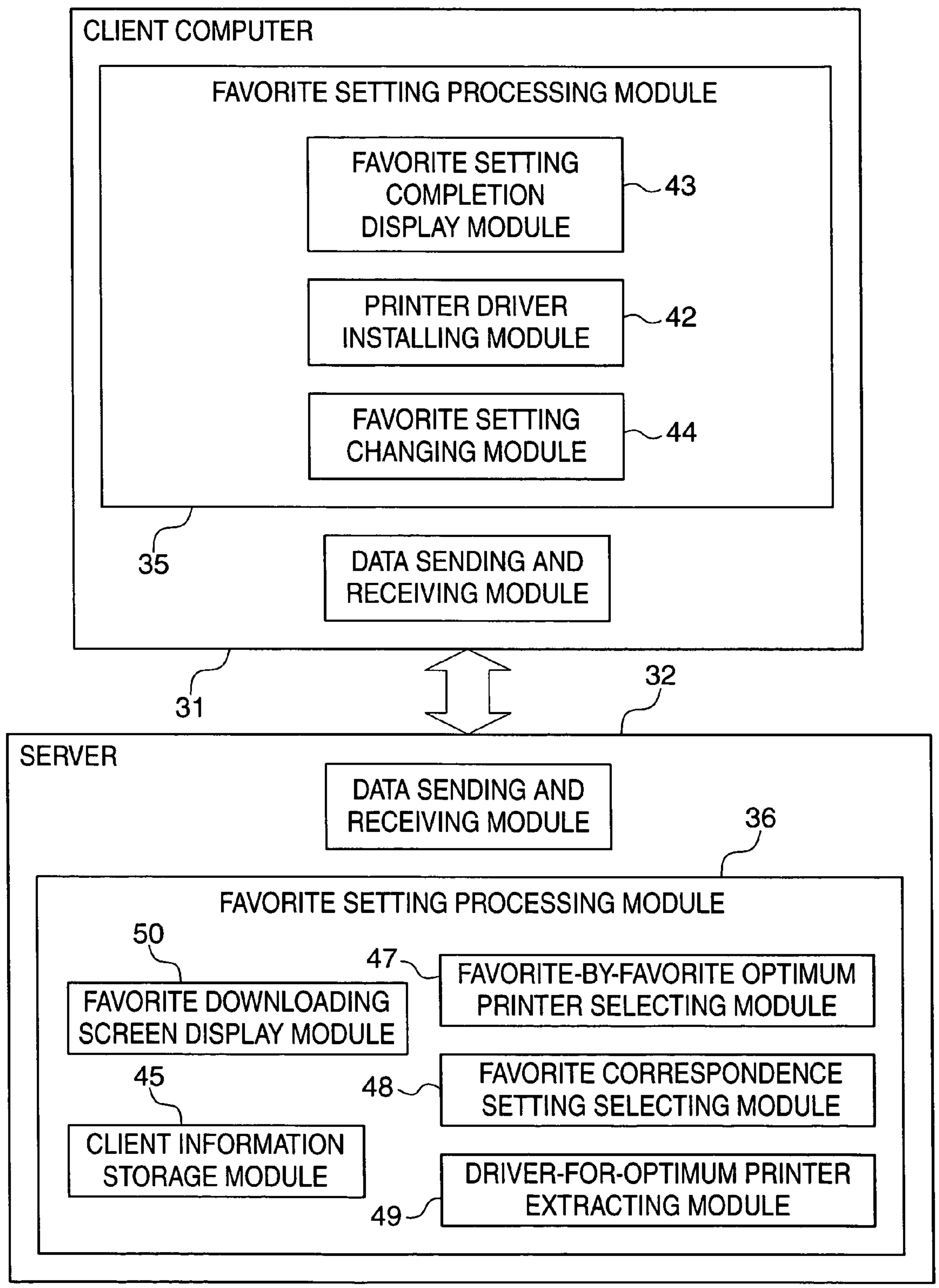
FIG. 11 is a block diagram showing the internal configurations of favorite setting processing modules 35 and 36 appearing in FIG. 10.

FIG. 11 is a block diagram showing the software configurations of the favorite setting processing modules 35 and 36 appearing in FIG. 10.

As shown in FIG. 11, the favorite setting processing module 35 is comprised of a favorite setting completion display module 42, a printer driver installing module 43, and a favorite setting changing module 44, which are programs operating on the client computer 31.

The favorite setting processing module 36 is comprised of a favorite downloading screen display module 50, a client information storage module 45, a favorite-by-favorite optimum printer selecting module 47, a favorite correspondence setting selecting module 48, and a driver-for-optimum printer extracting module 49, which are programs operating on the server 32.

The favorite downloading screen display module 50 is a program for displaying a common favorite setting designating screen, not shown, on a display, not shown, of the client computer 31 irrespective of the presence and type of the printer driver 38 installed in the client computer 31, and is used when the server administrator who administrates the server 32 designates favorite settings to be downloaded and notifies them to a predetermined client computer 31.

Figure 12:
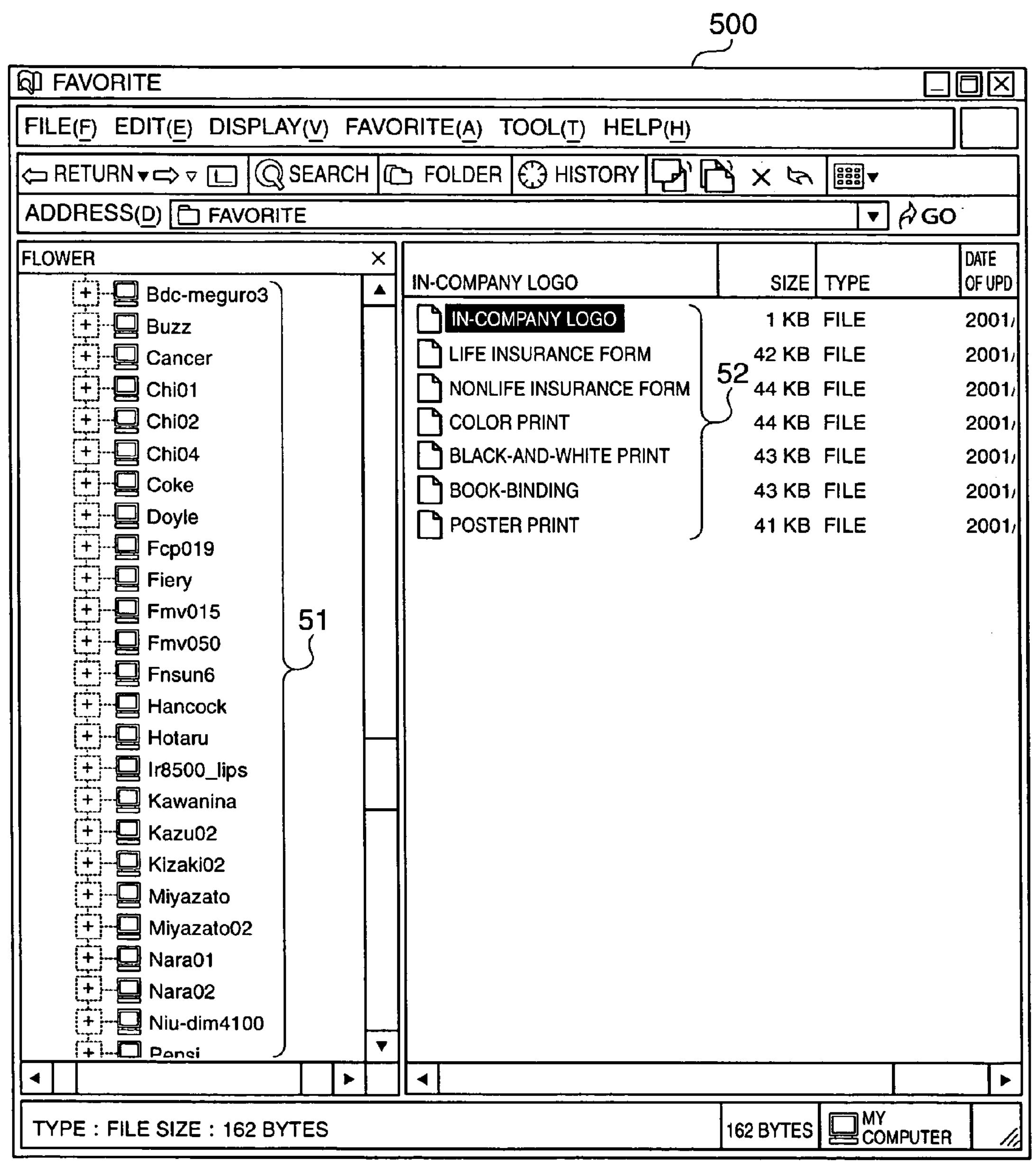
FIG. 12 is a view showing an example of a favorite downloading screen displayed in the server 32 appearing in FIG. 10.

FIG. 12 is a view showing an example of the favorite downloading screen displayed in the server 32.

The favorite downloading screen 500 in FIG. 12 is displayed by the favorite display module 50. A plurality of favorite settings 52 and a folder group 51 of the plurality of client computers 31 on the network 34 are displayed on the favorite downloading screen 500. When the server administrator designates desired favorite settings from among the favorite settings 52 and a client computer 31 to which the favorite settings are downloaded, the client information storage module 45 selects client information 56 (first information) in FIG. 23 stored in a storage device, not shown, such as a hard disk, and whether or not a printer driver has been installed in the concerned client computer 31 is determined according to the client information 56.

Figure 23:
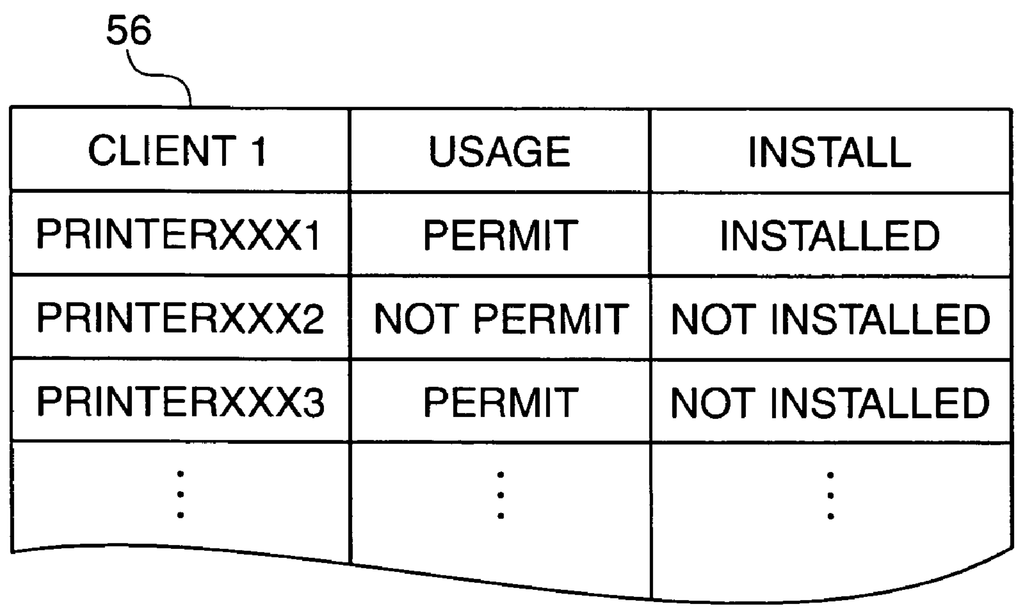
FIG. 23 is a diagram showing the details of client information in the client server system.

As shown in FIG. 23, the client information 56 contains adaptability information on the plurality of printers 33 for a predetermined client computer 31. In the client information 56, the word "permit" means that the predetermined client computer 1 can use a concerned printer 3, and the words "not permit" mean that the predetermined client computer 1 cannot use a concerned printer 3. For example, a "client 1" can use a "printer XXX1" and a "printer XXX3", but cannot use a "printer XXX2".

Figure 22:
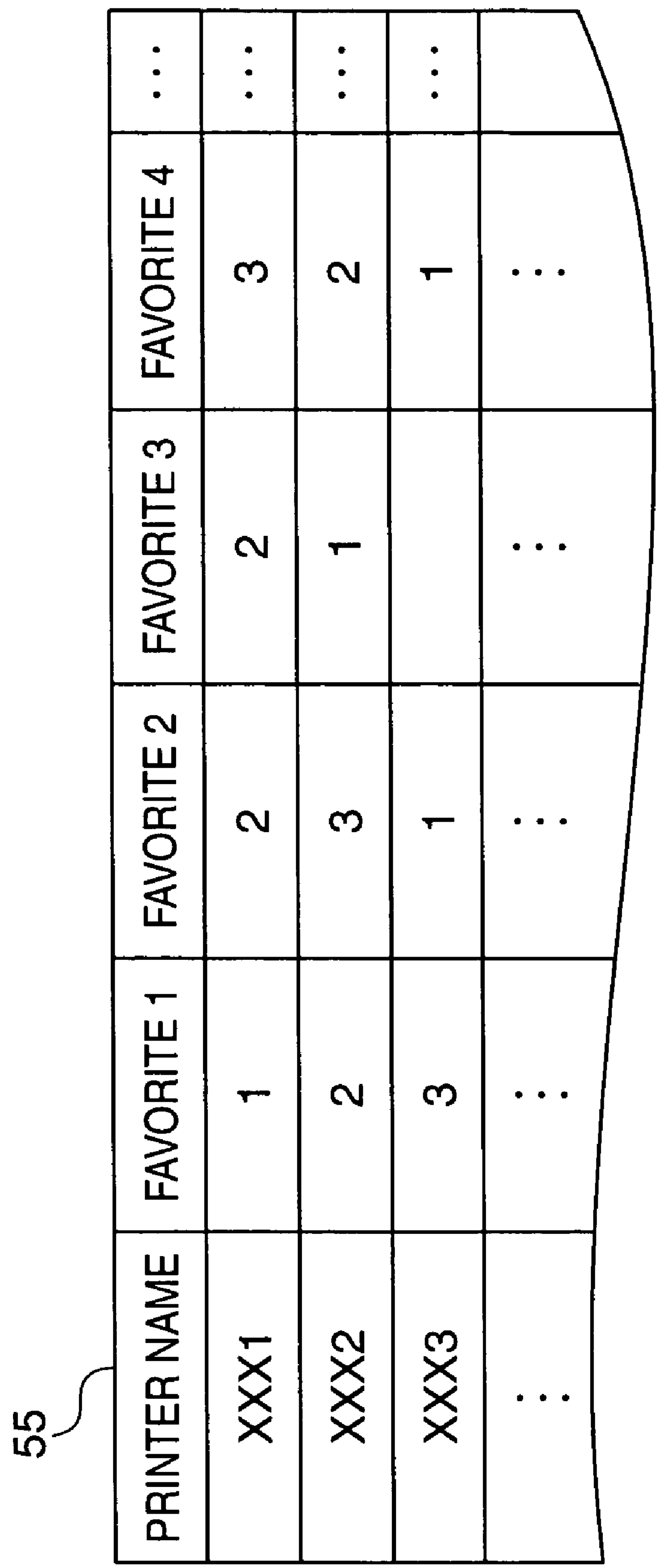
FIG. 22 is a diagram showing the details of printer information in the client server system.

Also, the client information 56 is associated with information indicative of whether or not a printer driver has been installed in the client computer 31. If, according to the client information, it is determined that a printer driver has not been installed in the client computer 31, printer information 55 in FIG. 22 is selected by the favorite-by-favorite optimum printer selecting module 47, so that the optimum printer 33 is selected according to the favorite setting designated by the server administrator. It should be noted that although the printer information 55 is stored in a printer information storage module of the server 32, this is not limitative, but the printer information 55 may be stored in another storage module (such as the client information storage module 45).

The printer information 55 in FIG. 22 contains the order of priority of the plurality of printers 33 for respective favorite settings. The optimum printer 33 is selected from among the plurality of printers 33 on the network 34 according to the printer information 55. For example, if the user designates a "favorite 3", a "printer XXX" with a priority "1" for the "favorite 3" in the printer information 55 is selected. On this occasion, if the printer "XXX2" cannot be used for printing since it is in use or has broken down, a "printer XXX1" with a priority "2" is selected. It should be noted that a blank in FIG. 22 indicates that a concerned printer 33 is not adapted to an arbitrary favorite setting. A printer 33 adapted to an input favorite setting is selected according to the order of priorities.

Further, whether or not a printer 33 selected according to the printer information 55 can be used by a predetermined client computer 31 is determined according to the client information 56. If it is determined that the selected printer 33 cannot be used by the client computer 31, a printer 33 with the next highest priority is newly selected according to the printer information 55, and whether or not the selected printer 33 can be used by the predetermined client computer 31 is determined again according to the client information 56. A printer driver for the printer 33 selected is extracted by the driver-for-optimum printer extracting module 49, and is sent to the client computer 31.

Figure 13:
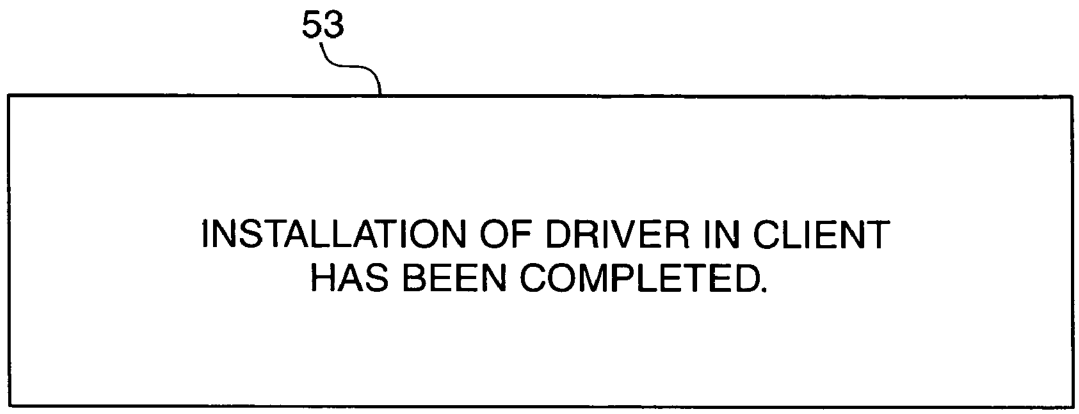
FIG. 13 is a view showing an example of a driver installation completion screen displayed in the server 32.

In the client computer 31, upon reception of the printer driver from the server 32, the printer driver installing module 42 installs the printer driver. Then, an installation completion notification is sent from the client computer 31 to the server 32, and a driver installation completion screen in FIG. 13 is displayed on the server 32.

Referring again to FIG. 11, the favorite correspondence setting selecting module 48 fetches the optimum favorite setting file in the printer 33 selected by the optimum printer selecting module 47, and sends the same to the client computer 31. Here, the selection of the printer 33 for use in printing and the installation of the printer driver have been completed at a time point when the favorite correspondence setting selecting module 48 starts processing.

As shown in FIG. 24, a favorite setting file table 57 contains optimum favorite setting files adapted to the respective printers 3 for respective favorite settings. Here, the favorite setting files depend on printer drivers and OSs, and are stored in actual file format or in data format, for example.

To further change settings for client computers or groups of client computers, favorite setting file tables 57 may be prepared for the respective client computers or groups of the client computers.

Figure 14:
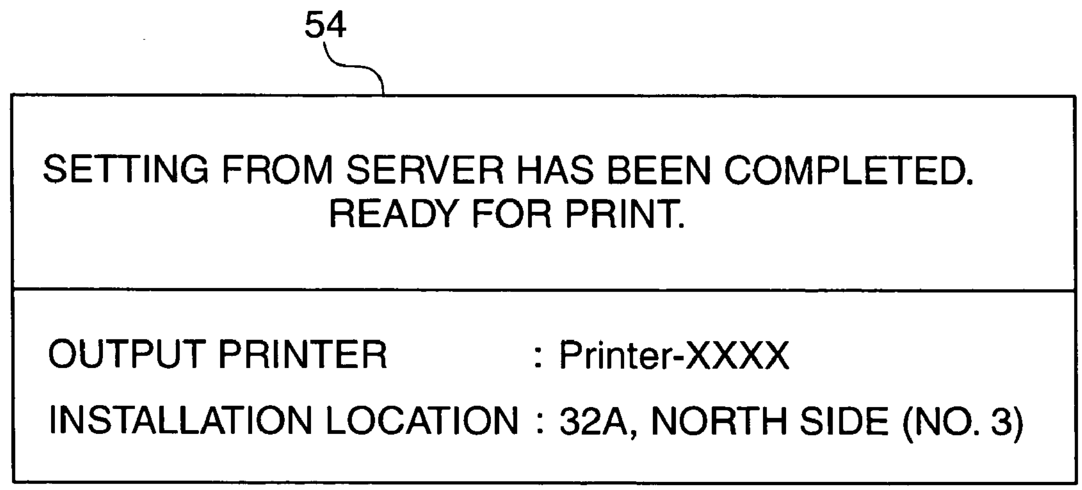
FIG. 14 is a view showing an example of a favorite setting completion screen displayed in the client computer 31.

In the client computer 31, upon reception of the favorite setting file from the server 32, the favorite setting changing module 41 changes favorite settings (print settings) of the installed printer driver. Upon completion of the change, the favorite setting completion display module 43 displays a favorite setting completion screen in FIG. 14 to indicate that the selection of the optimum printer 33 and the optimum change of the favorite settings for the user have been completed. Thereafter, the user has only to depress a print button or the like to print desired print data using the printer 33 selected by the server administrator and according to the favorite settings designated by the server administrator.

Figure 15A:
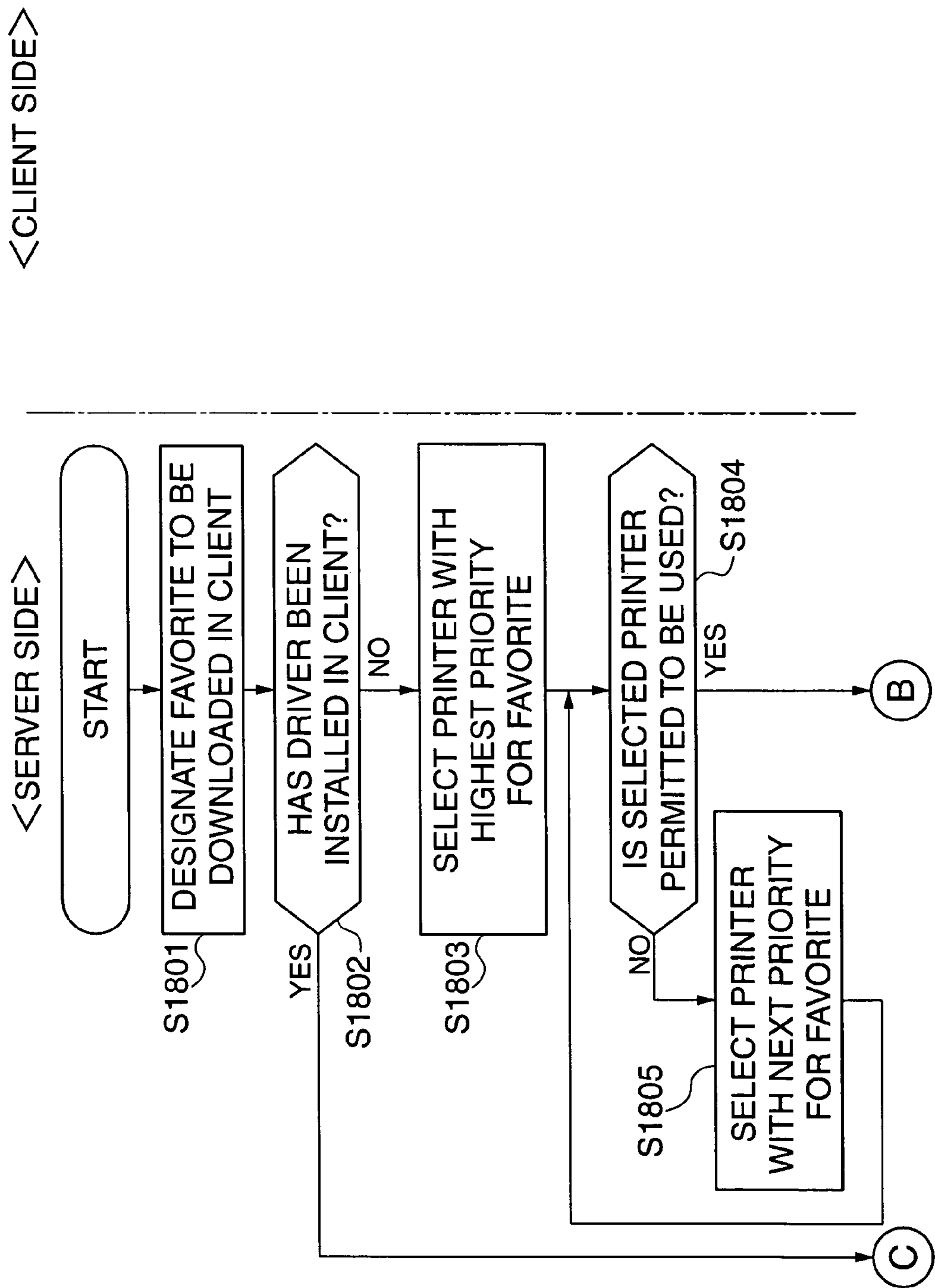
FIGS. 15A and 15B are flow chart showing a favorite setting process carried out in the client server system in FIG. 9.
Figure 15B:
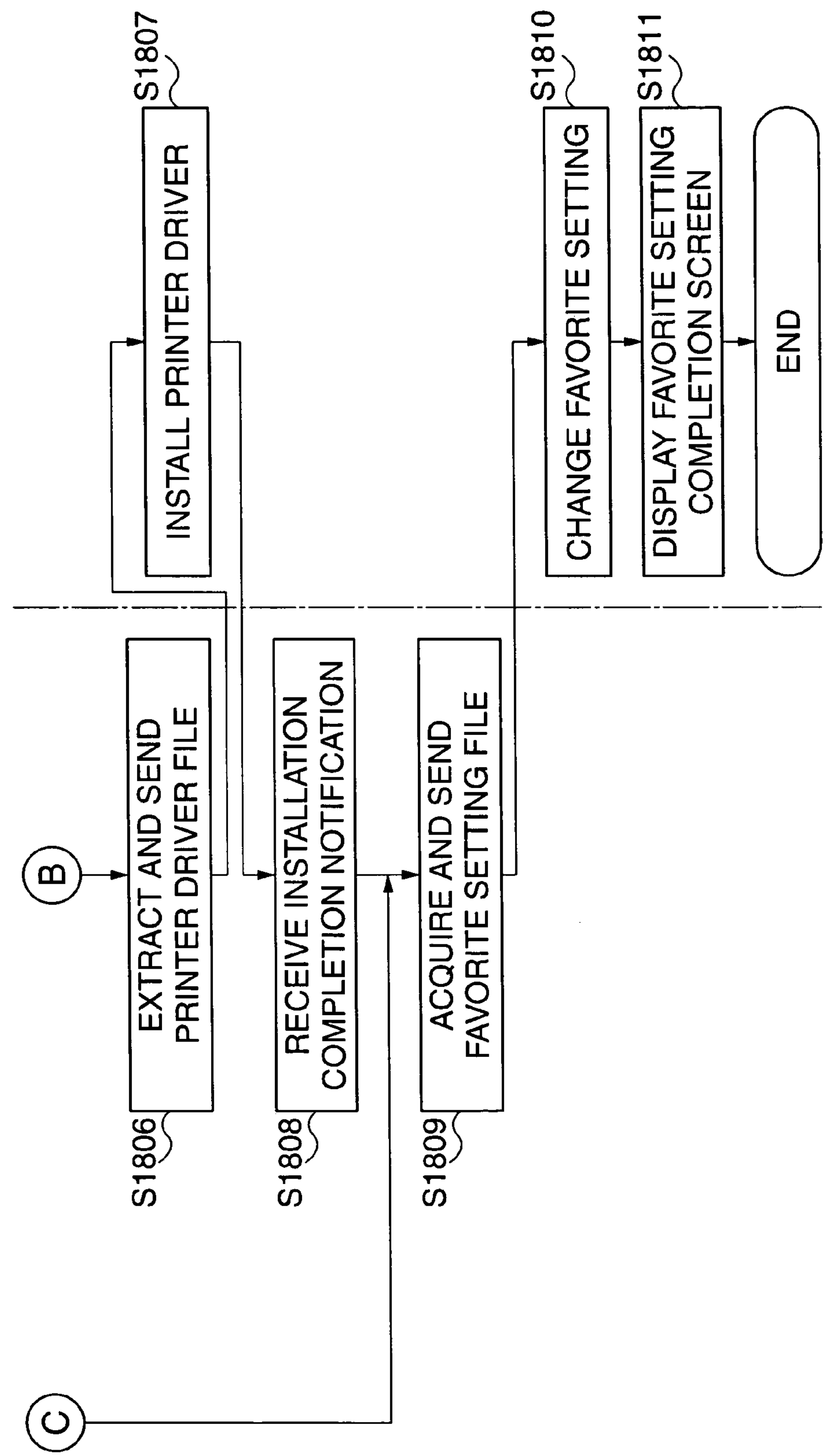

FIGS. 15A and 15B are flow chart showing a favorite setting process carried out in the client server system in FIG. 11.

In FIG. 15A, first, on the server side, for the server administrator to designate favorite settings to be downloaded to a predetermined client computer 31, the favorite setting designating screen 500 is displayed, and a favorite setting to be downloaded is designated from among the favorite settings 51 (step S1801). It is assumed here that a program for displaying the favorite setting designating screen 20 is stored in advance in the server 32.

Then, when the server administrator designates a desired favorite setting and a folder of the client computer 31 on the displayed favorite setting designating screen 500, it is determined whether or not the printer driver 38 has been installed in the designated client computer 31 (step S1802).

If it is determined in the step S1802 that the printer driver 38 has been installed in the client computer 31 ("YES" to the step S1802), the process proceeds to a step S1809. On the other hand, it is determined in the step S1802 that the printer driver 38 has not been installed in the client computer 31 ("NO" to the step S1802), a printer 32 with the highest priority for the designated favorite setting is selected (step S1803).

Then, whether or not the client computer 31 is permitted to use the selected printer 33 is checked to determine whether or not the client computer 31 can use the selected printer 33 (step S1804). If the determination result is negative ("NO" to the step S1804), a printer 33 with the next highest priority is selected (step S1805), and then the process returns to the step S1804. On the other hand, if the determination result is positive ("YES" to the step S1804), the process proceeds to a step S1806. It should be noted that the steps S1803 to S1805 are executed by the favorite-by-favorite optimum printer selecting module 47.

In the step S1806, a file of a printer driver adapted to the selected printer is extracted from the printer driver file 39, and is sent to the client computer 31 (step S1806).

On the client side, upon reception of the file of the printer driver from the server 32, the printer driver is installed in the client computer 31, and upon completion of the installation, an installation completion notification is sent to the server 32 (step S1807).

On the server side, upon reception of the installation completion notification from the client computer 31 (step S1808), a favorite setting file corresponding to the favorite setting designated in the step S1801 is acquired from the favorite setting file table 57 with the printer driver installed in the client computer 31, and is sent to the client computer 31 (step S1809).

On the client side, settings (print settings) of the installed printer driver are changed according to the received favorite setting file (step S1810), and a favorite setting completion screen is displayed (step S1811), followed by termination of the process.

In the above process, in the case where the printer driver has not been installed in the client computer 31, the printer driver is installed in the client computer 31, but in an alternative form, the printer 33 may be prohibited from being used, and the steps S1803 to S1808 may be omitted.

Further, in the above process, in the case where the printer driver adapted to the selected printer 33 has not been installed in the client computer 31, the printer driver is installed in the client computer 31, but the printer driver may be installed in advance in the client computer 31. In this case, the client computer 31 has to be provided with a driver-for-optimum printer extracting module in place of the printer driver installing module 42, whereas the server 32 does not have to be provided with the driver-for-optimum printer extracting module 49.

In the above described embodiment, the present invention is applied to a client server system in which one server 32, a plurality of client computers 31, and a plurality of printers 33 are connected to a network 34, but may easily be applied to a system comprised of one client computer 31 or one printer 33.

Further, in the client server system according to the above described embodiment, the printers 23 are implemented by network printers which are directly connected to the network 34 as shown in FIG. 9, but may be connected to the network 34 via computers (such as a print server) connected thereto. Also, the server 32 may also server as a print server. Further, it goes without saying that the network 34 should not necessarily be implemented by a LAN, but may also be implemented by other networks. The client computers 31, the server 32, the printers 33, and so forth may be connected to the network 34 via wireless communication.

According to the above described second embodiment, the server 32 determines whether or not a printer driver has been installed in the client computer 31 selected on the favorite downloading screen 500, selects the optimum printer 33 for use in printing to be carried out by the user who uses the client computer 31 if the printer driver has not been installed in the client computer 31, and sends a printer driver for the selected printer 33 and a favorite setting file of the printer driver to the client computer 31, so that the client computer 31 installs therein the received printer driver, and changes favorite settings according to the favorite setting file. As a result, the server administrator has only to designate a desired client computer 31 and favorite settings to make desired print settings for the client computer 31 and restrict printers for use in output. Also, even in the case where the printers 33 connected to the network are changed or a new printer is added, favorite settings common to the printers on the network can be designated.

A description will now be given of a third embodiment of the present invention.

Figure 16:
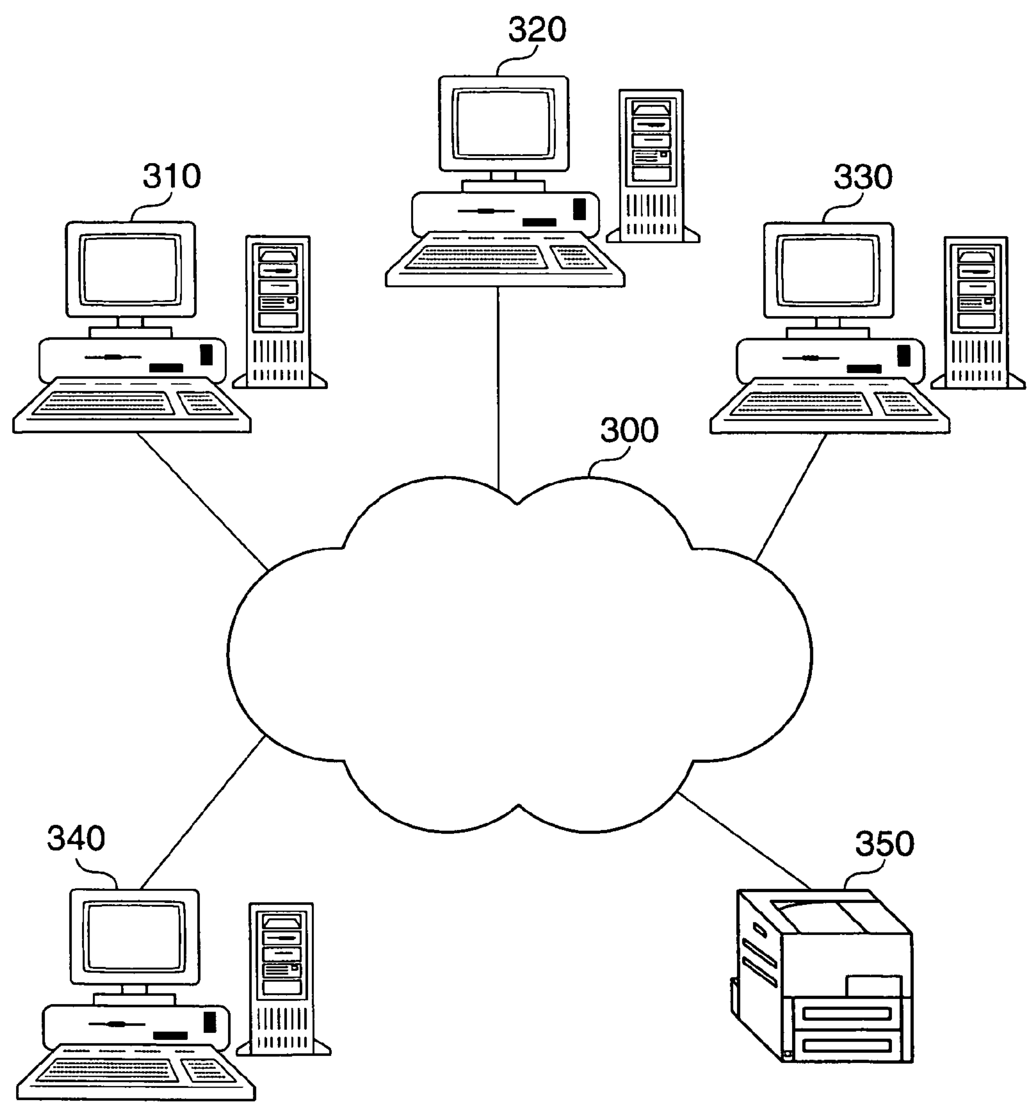
FIG. 16 is a view schematically showing the entire construction of a client server system according to a third embodiment of the present invention.

FIG. 16 is a view schematically showing the entire construction of a client server system according to the third embodiment.

As shown in FIG. 16, the client server system according to the present embodiment is comprised of servers 330 and 340 which centrally manage information resources, a plurality of client computers 310 and 320 which can use the information resources stored in the servers 330 and 340, and a printer 350. The servers 330 and 340, the client computers 310 and 320, and the printer 350 are connected to each other via a network 300 such as a LAN (Local Area Network).

The client computer 310 is for printing, and is used by an ordinary user. The client computer 310 uses a printer driver to cause the printer 350 to perform printing. A printer driver is remotely installed in the client computer 310 by a server administrator.

The client computer 320 is used by the server administrator, and is adapted to install a printer driver in the client computer 310 or the like and makes settings therefor so that an ordinary user can perform printing using the printer 350.

The server 330 is an e-mail server which sends and receives e-mails. Mainly, in response to an instruction from the server administrator, the server 340 creates an installation program and an installation information file for installing a printer driver in the client computer 310 or the like, attaches them to an e-mail and sets a destination address, and sends the e-mail 1 to the server 330. The network 300 is for supporting the TCP/IP protocol, for example.

The above described construction is only a typical one, and it goes without saying that the number of client computers to be used by users may be either one or more. Also, an information processing apparatus to be used by the server administrator should not be limited to the client computer 320, but may be the server 340 or 330 on which the system according to the present invention operates.

Figure 17:
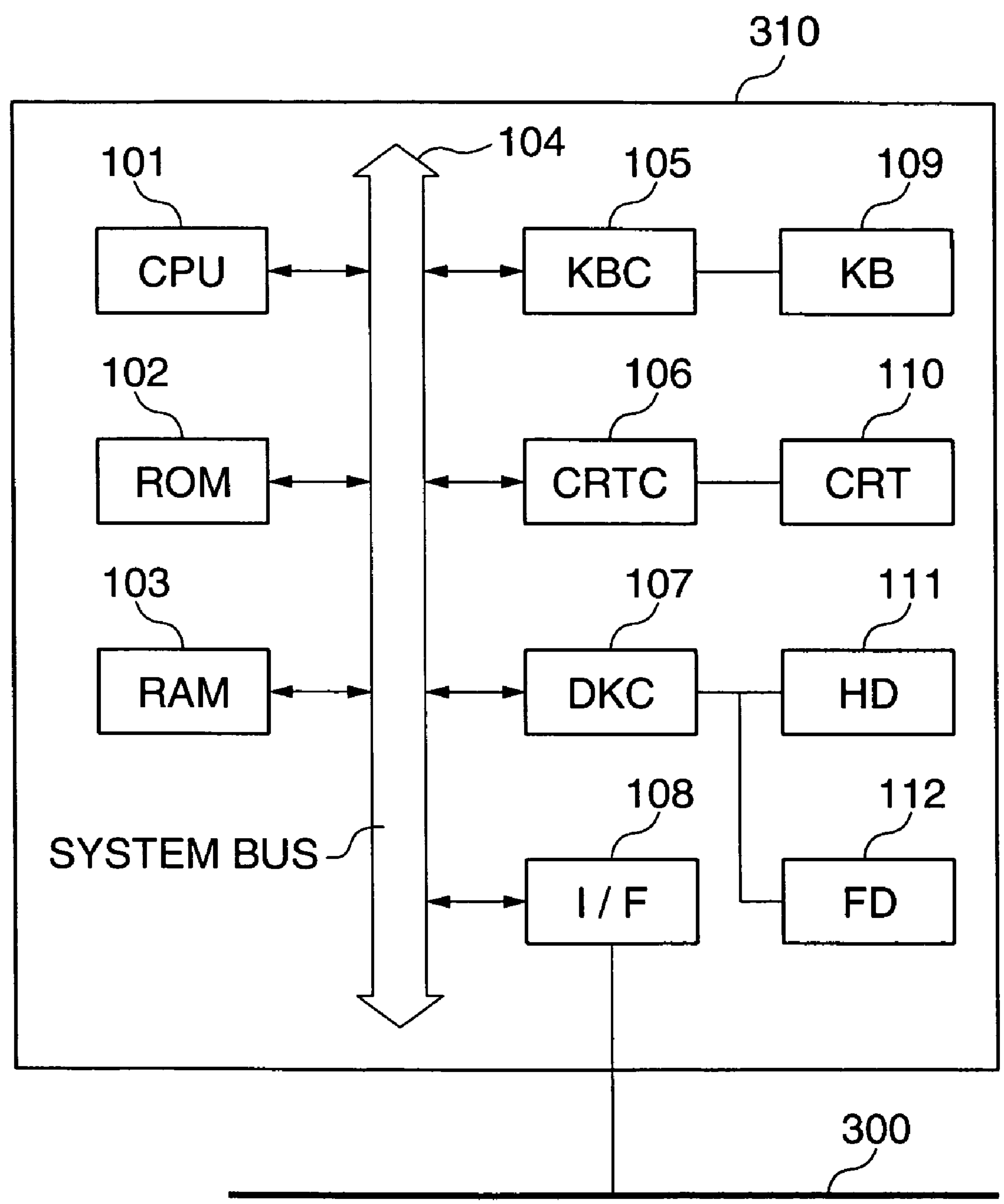
FIG. 17 is a block diagram showing the internal construction of an information processing apparatus appearing in FIG. 16.

FIG. 17 is a diagram showing the internal construction of the information processing apparatuses appearing in FIG. 16. The client computers 310 and 320 and the servers 330 and 340 are ordinary information processing apparatuses which are substantially identical in construction, and therefore, a description will now only be given of the client computer 310.

The client computer 310 in FIG. 17 includes a CPU 101 which executes a printing application program, a printer driver, or an installation program creating program stored in a ROM 102 or a hard disk (HD) 111, or supplied from a floppy (registered trademark) disk driver (FD) 112, to centrally control the operation of devices connected to a system bus 104.

A RAM 103 functions as a main memory, a working area, and so forth for the CPU 101. A keyboard controller (KBC) 105 controls the input of instructions from a keyboard (KB) 109, a pointing device, not shown, and so forth. A CRT controller (CRTC) 106 controls display on a CRT display (CRT) 110. A disk controller (DKC) 107 controls access to the hard disk (HD) 111 storing a boot program, various application programs, editing files, user files, the installation program creating program, and so forth, and a floppy disk controller (FDC).

A host interface (I/F) 108 bi-directionally sends and receives data to and from local printers, network printers, other network equipment, or other computers (PCs) via the LAN 300.

Figure 18:
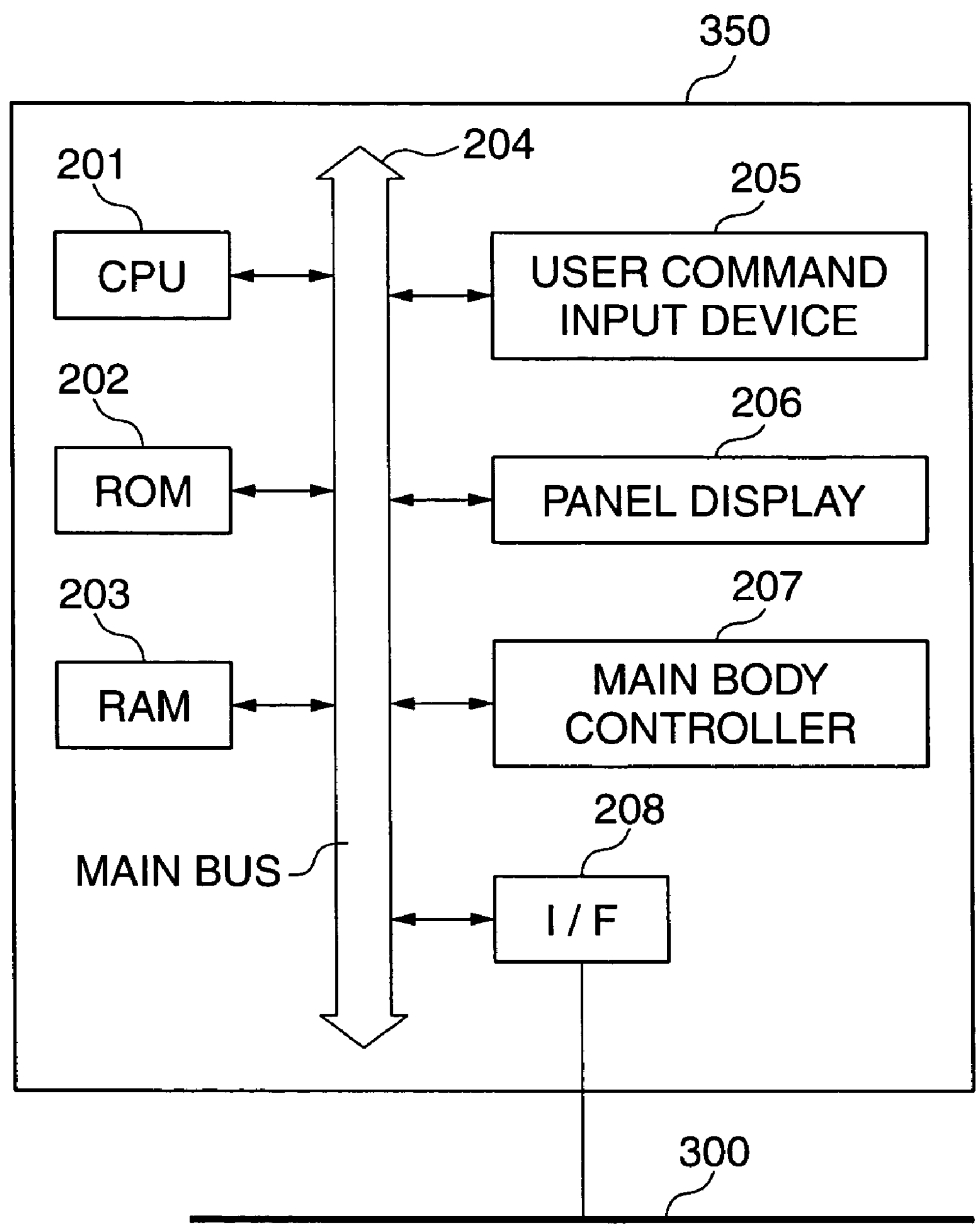
FIG. 18 is a block diagram showing the internal constructions of a printer 350 appearing in FIG. 16.

FIG. 18 is a block diagram showing the internal construction of the printer 350 appearing in FIG. 16.

The printer 350 in FIG. 18 is a network device including a CPU 201 which executes software programs supplied from a storage medium such as a ROM 202 or a RAM 203.

The RAM 203 functions as a main memory, a working area, and so forth for the CPU 201. A user command input device 205 controls the input of instructions from e.g. panel buttons of the printer 350. A panel display 206 controls the main body of the printer 350 using a liquid crystal display in a main body panel, and displays the status of the main body of the printer 350. A main body controller 207 serves as a printing device to control the main body of the printer 305. A host interface (I/F) 208 bi-directionally sends and receives data to and from local printers, network printers, other network equipment, or other computers (PCs) via the network 300.

Figure 19:
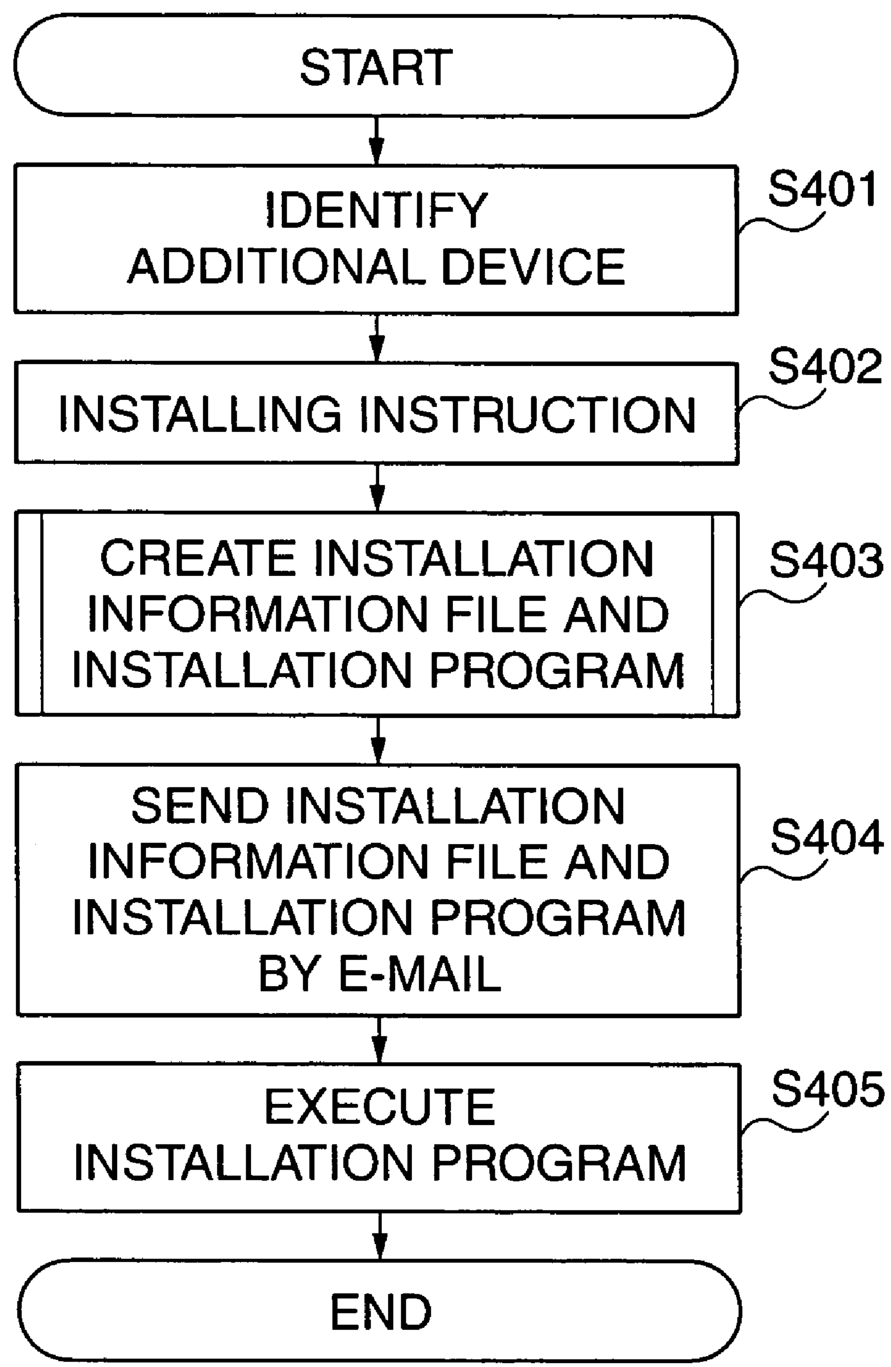
FIG. 19 is a flow chart showing a printer driver installing process carried out in the client server system in FIG. 16.

FIG. 19 is a flow chart showing a printer driver installing process carried out in the client server system in FIG. 16.

It is assumed that IP addresses on the network are given to respective ones of the above described client computers 310 and 320, servers 330 and 340, and printer 350, and the user uses LPR software through the operation of each client computer to perform direct printing without using a print server or the like.

First, when a new printer 350 is connected to the network 300, a printer driver for the printer 350 must be installed in the client computer 310 or the like to configure the printer driver so that an ordinary user can use the printer 305. To this end, the server administrator sets an IP address for the printer 350 as an additional device as needed so that the printer 350 can be identified according to the IP address (step S401).

Then, in a step S402, the server administrator designates the IP address and model name of the printer 350, a user name, the type of an OS installed in the client computer 310, and so forth to give an instruction for installing the printer driver.

The instruction may be given by e.g. calling the installation program via remote procedure call. In the case where the installation program creating program is a Web application program, a browser therefor is activated to input the IP address of the printer 350 or send the instruction via e-mail. In an alternative form, the instruction may be given to the installation program.

Then, in a step S403, an installation information file and an installation program for the printer 350 are created according to the installation program creating program. Then, the created installation information file and installation program are attached to an e-mail, which is sent to the user of the client computer 310 which carries out installation as instructed as above (step S404).

In a step S405, the user who has received the e-mail executes the installation program attached to the e-mail to install the printer driver in the client computer 310.

The printer driver installed in the client computer 310, when activated, acquires and displays configuration information relating to the printer 350 by referring to the installation information file attached to the e-mail. It should be noted that depending on the type of e-mail software used, the installation program may be automatically executed in timing in which the e-mail is received and opened.

In the present embodiment, the installation information file is attached to the e-mail, but may not be attached if unnecessary. Also, the network 300 supports the TCP/IP protocol, but it goes without saying that the network 300 may support other protocols, and a print server may be used for printing.

Figure 20:
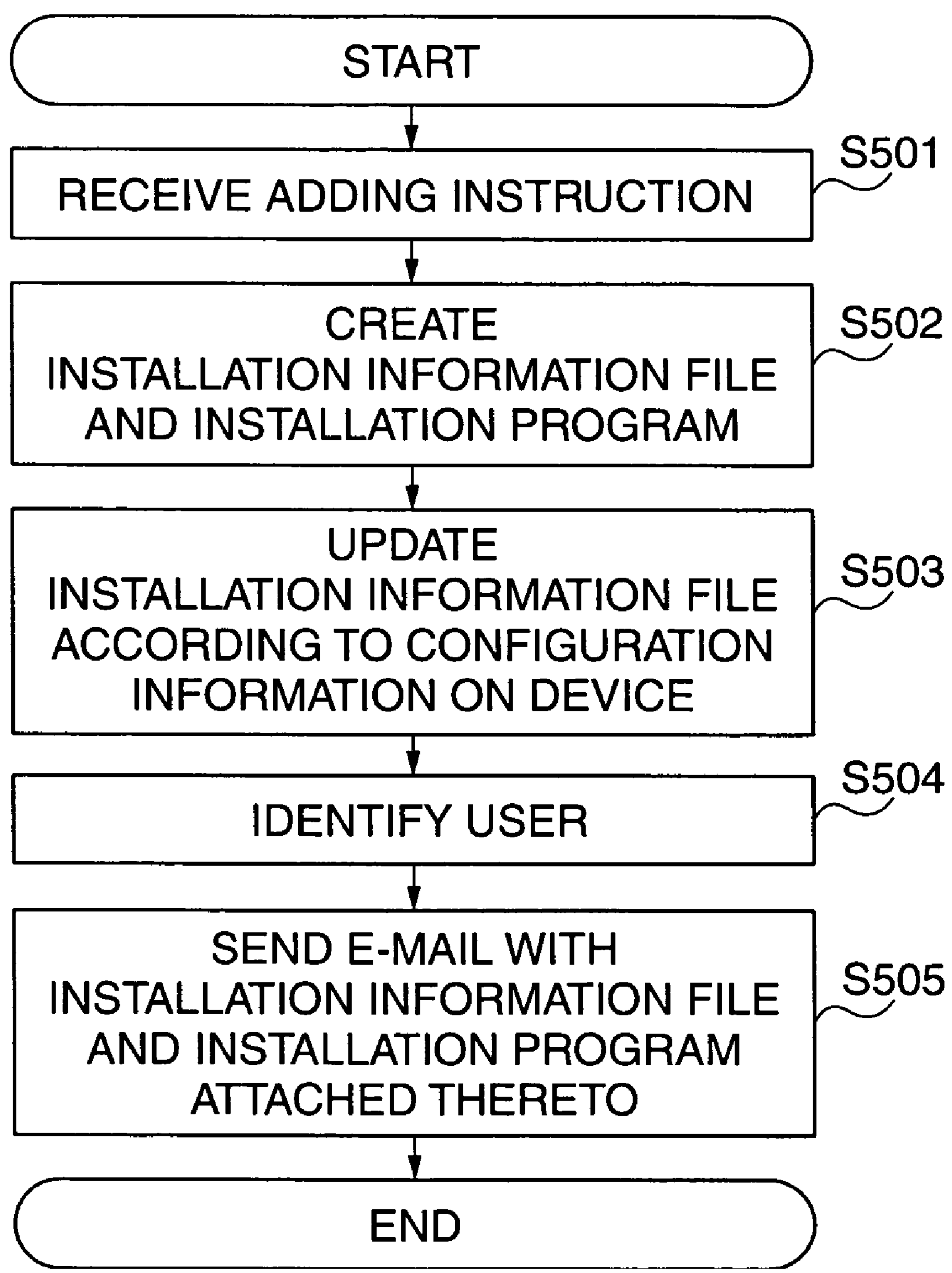
FIG. 20 is a flow chart showing an installation program creating process carried out in the client server system.

FIG. 20 is a flow chart showing an installation program creating process carried out in the client server system in FIG. 16.

As shown in FIG. 20, in a step S501, according to an adding instruction from the server administrator, information such as the IP address and model name of the printer 350 for which a printer driver is to be installed and the type of an OS installed in the client computer 310 is identified.

Next, an installation program and an installation information file are created according to the identified information (step S502). For example, a list of the names of files to be installed, registries to be installed (in the case where the OS is Windows (registered trademark)), and so forth is created. To perform LPR printing, a print-port must be created, and accordingly, a print port creating module, not shown, needs to be added to the installation program.

In a step S503, configuration information relating to the printer 350 such as the presence of a finisher and the memory capacity is added to the installation information file. The configuration information is acquired in any way; for example, the configuration information is actually acquired using e.g. SNMP/MIB, or a user interface through which configuration information can be input is prepared so that configuration information can be directly input after the server administrator directly looks at and searches it.

In a step S504, in response to the adding instruction received in the step S501, an address to which an e-mail is to be sent is acquired to identify a user. Then, the installation program and installation information file created in the step S502 are attached to an e-mail, which is sent to the address acquired in the step S504 (step S504), followed by termination of the process.

As stated above, when a new printer 350 is added to the client server system, the server administrator gives an instruction so that an installation program and an installation information file can be sent to a desired client computer via e-mail, and therefore, it is possible to install a printer driver without substantial intervention of a user. Further, the user interface of a printer driver is displayed based on configuration information set in advance by the server administrator, and therefore, it is possible to perform various kinds of optional printing without requiring the substantial intervention of a user.

Figure 21:
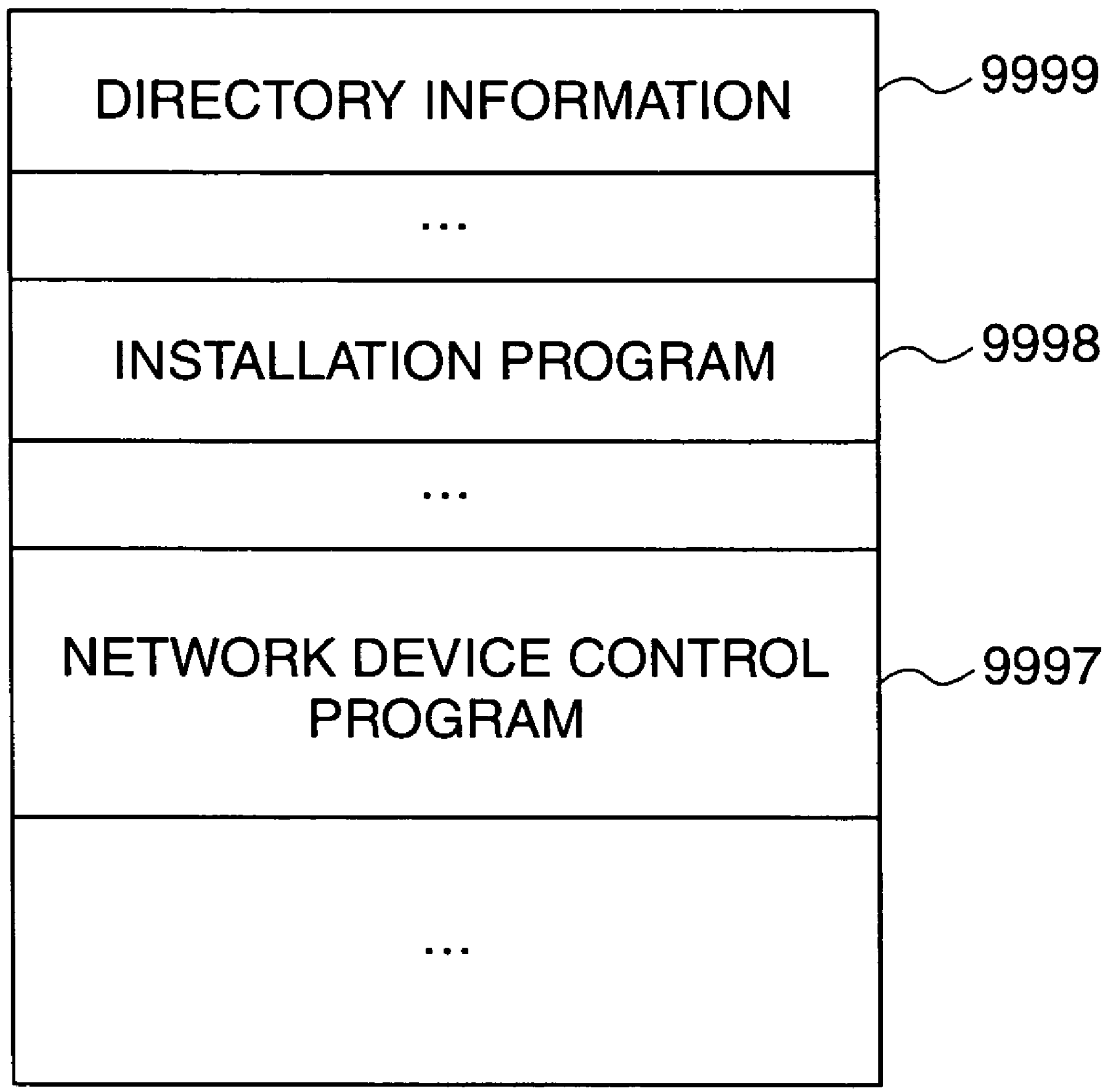
FIG. 21 is a diagram showing the internal structure of information stored in a ROM 102 appearing in FIG. 17.

FIG. 21 is a diagram showing the internal structure of information stored in the ROM 102 appearing in FIG. 17.

In FIG. 21, a directory information area 9999 stores directory information, and indicates the positions of an installation program area 9998 and a network device control program area 9997. The installation program area 9998 stores an installation program. The network device control program area 9997 stores the above described installation creating program or installation program.

To install the programs of the present invention in the computer 310, the installation program stored in the installation program area 9998 is loaded into the system, and executed by the CPU 101. Then, the installation program executed by the CPU 101 reads out the program from the network from the network device control program 9997, and stores the same in the hard disk 111.

According to the above described third embodiment, even in the case where a new printer is added on the network, an instruction is given manually by the server administrator, or automatically by a server (or a client computer) to install a required printer driver in the client computer without intervention of a user, and there is no necessity of configuring the printer driver after the installation thereof, and therefore, it is possible to immediately use the added printer.

Further, it is possible to collectively distribute favorite settings common to all the client computers on the network, and restrict printers for use in output.

Although in the above describe embodiment, when a new printer is added on the network, the server administrator finds the printer and manually gives an instruction to send an e-mail with an installation program and an installation information file for a printer driver attached thereto, some types of printers may give a notification e.g. after they are connected to the network 300. In this case, the server or the like is provided with a program for detecting such a notification so that the instruction can be automatically given upon detection of the notification. On this occasion, an e-mail may be sent to a user who has been registered in advance, or all the users who are assumed to be connected to the network via a directory service.

Further, in the above described embodiment, an e-mail with an installation information file including a printer driver installation program and configuration information attached thereto is sent to a client computer so that a printer driver can be installed in the client computer. Further, the printer driver is activated by referring to the installation information file. Therefore, it is possible to perform various kinds of optional printing without requiring the substantial intervention of a user.

On the other hand, it goes without saying that in the case of an NDPS printer driver distributing function, an installation information file as well as the file of a printer driver may be distributed to a client computer, and the printer driver may be activated by referring to the installation information file as above.

Although the above described embodiment relates to the installation and setting of a printer driver, this is not limitative, but user software which requires configuration information on the printer 350, such as software which forms a print layout, may be installed.

The installation program creating program may be executed by the computer 350 according to a program installed from an external device. In this case, a group of pieces of information including the program may be supplied to the computer 100 from a storage medium such as a CD-ROM, a flash memory, or a floppy disk, or by loading an information group including the program onto the computer 100 from an external storage medium via a network such as e-mail or personal computer communication.

In the above described first and second embodiments, a printer driver is installed using the printer driver installing module 12 or the printer driver installing module 42, but may be installed according to an installation information file and an installation program sent from the server 2 or the server 32 as in the above described third embodiment.

Further, in the above described first and second embodiments, the favorite display module 10 or the favorite downloading screen display module 50 may acquire and display configuration information on the printer 3 or 33 by referring to an installation information file. Of course, the configuration information includes information on an optional device attached to the printer 3 or 33, such as the presence of a finisher and the capacity of an installed memory.

The present invention may either be applied to a system or a compound apparatus comprised of a plurality of equipment (such as a host computer, an interface device, and a reader), or to a single apparatus. Also, it goes without saying that the present invention may either be applied to a printer connected to a network, but to a system to which other devices including a scanner are connected.

It is to be understood that the object of the present invention may also be accomplished by supplying a system or an apparatus with a storage medium (or a recording medium) in which a program of software, which realizes the functions of any of the above described embodiments is stored (a program corresponding to any of the flow charts of FIGS. 8A, 8B, 15A, 15B, 19, and 20), and causing a computer (or CPU or MPU) of the system or apparatus to read out and execute the program stored in the storage medium. In this case, the program is supplied directly from a storage medium in which the program is stored, or by downloading from another computer, a database, or the like, not shown, connected to the Internet, a commercial network, a local area network, or the like.

Further, the above program has only to realize the functions of any of the above-mentioned embodiments on a computer, and the form of the program may be an object code, a program executed by an interpreter, or script data supplied to an OS.

It is to be understood that the object of the present invention may also be accomplished by supplying a computer with a storage medium in which a program of software which realizes the functions of any of the above described embodiment is stored, and causing a the computer (or CPU) to read out and execute the program stored in the storage medium.

Although in the above described embodiments, the program code is stored in the ROM, the present invention is not limited to this, but a RAM, an NV-RAM, a hard disk, a flexible disk, an optical disk, a magnetic-optical disk, an MO, a CD-ROM, a CD-R, a CD-RW, a DVD-ROM, a DVD-RAM, a DVD-RW, a DVD+RW, a magnetic tape, a nonvolatile memory card, and another ROM may be used insofar as they can store the program code.

CROSS REFERENCE TO RELATED APPLICATION

This application claims priority from Japanese Patent Application No. 2003-205050 filed Jul. 31, 2003, which is hereby incorporated by reference herein.

What is claimed is:

1. An information processing apparatus that is connected to a server which manages information resources and at least one printing apparatus via a network, for using the information resources stored in the server, comprising:

a first display device that displays a print setting designating screen relating to print settings for obtaining and installing a printer driver of a printing apparatus to be selected by the server among the at least one printing apparatus;

a transmitting device that transmits the print settings designated on the print setting designating screen by a user and an ID of the information processing apparatus to the server;

a receiving device that receives a printer driver from the server, the received printer driver being adapted to the printing apparatus selected by the server in accordance with the print settings transmitted by the transmitting device;

an installing device that executes an initial installation of the received printer driver;

a setting device that executes an initial setup to set the print settings of the printer driver according to the transmitted print settings after the installing device executes the initial installation; and a second display device that displays a completion screen indicating completion of the initial installation of the printer driver.

2. An information processing apparatus according to claim 1, further comprising a creating and editing device that creates and edits contents of the print settings to be displayed on the print setting designating screen.

3. An information processing apparatus according to claim 1, wherein said installing device executes the initial installation of the printer driver according to installation information and an installation program transmitted from the server, and said first display device displays the installation information for acquiring and displays configuration information relating to the selected printing apparatus.

4. An information processing apparatus according to claim 3, wherein the configuration information includes information on an optional device attached to the printing apparatus.

5. An information processing apparatus that is connected to at least one client computer that uses information resources and at least one printing apparatus via a network for managing the information resources, comprising:

a receiving device that receives print settings from a client computer among the at least one client computer;

a selecting device that selects a printing apparatus among the at least one printing apparatus corresponding to the print settings transmitted from the client computer and received by the receiving device and an ID of the client computer;

a determining device that determines whether a printer driver adapted to the selected printing apparatus has been installed in the client computer; and a first transmitting device that transmits the printer driver to the client computer when the printer driver has not been installed in the client computer.

6. An information processing apparatus according to claim 5, further comprising:

an acquiring device that acquires print setting information adapted to the printer driver for the selected printing apparatus in accordance with the print settings received by the receiving device; and a second transmitting device that transmits the acquired print setting information to the client computer.

7. An information processing apparatus according to claim 5, further comprising:

a first information storage device that stores information relating to the client computer as first information;

a second information storage device that stores information relating to the selected printing apparatus as second information; and a first information acquiring device that acquires the first information from the client computer when printing is carried out by the selected printing apparatus.

8. An information processing apparatus according to claim 7, further comprising a second information acquiring device that acquires the second information from the selected printing apparatus in advance.

9. An information processing apparatus according to claim 7, further comprising a second information acquiring device that acquires the second information from the selected printing apparatus when printing is carried out by the selected printing apparatus.

10. An information processing apparatus according to claim 5, wherein said selecting device selects the printing apparatus according to a predetermined order of priority of a plurality of printing apparatuses as the printing apparatus or usage conditions of the printing apparatus.

11. An information processing apparatus according to claim 5, wherein said first transmitting device transmits the printer driver from another apparatus.

12. An information processing apparatus according to claim 5, further comprising a creating device that creates installation information relating to the printer driver and an installation program, the installation program including configuration information on the selected printing apparatus.

13. An information processing apparatus according to claim 12, wherein the configuration information includes contents of an optional device attached to the printing apparatus.

14. A method of controlling an information processing apparatus that is connected to a server which manages information resources and at least one printing apparatus via a network, for using the information resources stored in the server, comprising:

a first display step of displaying a print setting designating screen relating to print settings for obtaining and installing a printer driver of a printing apparatus to be selected by the server among the at least one printing device;

a transmitting step of transmitting the print settings designated on the print setting designating screen by a user and an ID of the information processing apparatus to the server;

a receiving step of receiving a printer driver from the server, the received printer driver being adapted to the printing apparatus selected by the server in accordance with the print settings transmitted in the transmitting step;

an installing step of executing an initial installation of the received printer driver;

a setting step of executing an initial setup to set the print settings of the received printer driver according to the transmitted print settings after the installing step executes the initial installation; and a second display step of displaying a completion screen indicating completion of the initial installation of the printer driver.

15. An information processing method according to claim 14, further comprising a creating and editing step of creating and editing contents of the print settings to be displayed on the print setting designating screen.

16. An information processing method according to claim 14, wherein said installing step comprises executes the initial installation of the printer driver according to installation information and an installation program transmitted from the server, and said first display step comprises displaying the installation information for acquiring and displays configuration information relating to the selected printing apparatus.

17. An information processing apparatus according to claim 16, wherein the configuration information includes information on an optional device attached to the printing apparatus.

18. An information processing method according to claim 14, wherein a program for displaying the print setting designating screen relating to the printing apparatus in said first display step is provided from the server when printing is carried out by the printing apparatus.

19. A method of controlling an information processing apparatus that is connected to at least one client computer that uses information resources and at least one printing apparatus via a network for managing the information resources, comprising:

a receiving step of receiving print settings from a client computer among the least one client computer;

a selecting step of selecting a printing apparatus among the at least one printing apparatus corresponding to the print settings transmitted from the client computer and received in the receiving step and an ID of the client computer;

a determining step of determining whether a printer driver adapted to the selected printing apparatus has been installed in the client computer; and a first transmitting step of transmitting the printer driver to the client computer when the printer driver has not been installed in the client computer.

20. An information processing method according to claim 19, further comprising:

an acquiring step of acquiring the print setting information adapted to the printer driver for the selected printing apparatus in accordance with the print settings received in the receiving step; and a second transmitting step of transmitting the acquired print setting information to the client computer.

21. An information processing method according to claim 19, further comprising:

a first information storage step of storing information relating to the client computer as first information in a first information storage device;

a second information storage step of storing information relating to the selected printing apparatus as second information in a second information storage device; and a first information acquiring step of acquiring the first information from the client computer when printing is carried out by the selected printing apparatus.

22. An information processing method according to claim 21, further comprising a second information acquiring step of acquiring the second information from the printing apparatus in advance.

23. An information processing method according to claim 21, further comprising a second information acquiring step of acquiring the second information from the printing apparatus when printing is carried out by the selected printing apparatus.

24. An information processing method according to claim 19, wherein said selecting step comprises selecting the printing apparatus according to a predetermined order of priority of a plurality of printing apparatuses as the printing apparatus or usage conditions of the printing apparatus.

25. An information processing method according to claim 19, wherein said first transmitting step comprises transmitting the printer driver from another apparatus.

26. An information processing method according to claim 19, further comprising a creating step of creating installation information relating to the printer driver and an installation program, the installation program including configuration information on the selected printing apparatus.

27. An information processing method according to claim 26, wherein the configuration information includes contents of an optional device attached to the printing apparatus.

28. A computer-readable medium storing a computer program for controlling an information processing apparatus that is connected to a server, which manages information resources, and at least one printing apparatus via a network, for using the information resources stored in the server, the computer program comprising:

a first display module for displaying a print setting designating screen relating to print settings for obtaining and installing a printer driver of a printing apparatus to be selected by the server among the at least one printing device;

a transmitting module for transmitting the print settings designated on the print setting designating screen by a user and an ID of the information processing apparatus to the server;

a receiving module for receiving a printer driver from the server, the received printer driver being adapted to the printing apparatus selected by the server in accordance with the print settings transmitted by the transmitting module;

an installing module for executing an initial installation of the received printer driver;

a setting module for executing an initial setup to set the print settings of the received printer driver according to the transmitted print settings after the installing module executes the initial installation; and a second display module for displaying a completion screen indicating completion of the initial installation of the printer driver.

29. A computer-readable medium storing a computer program for controlling an information processing apparatus that is connected to at least one client computer that uses information resources and at least one printing apparatus via a network for managing the information resources, the computer program comprising:

a receiving module for receiving print settings from a client computer among the least one client computer;

a selecting module for selecting a printing apparatus among the at least one printing apparatus corresponding to the print settings transmitted from the client computer and received by the receiving module and an ID of the client computer;

a determining module for determining whether a printer driver adapted to the selected printing apparatus has been installed in the client computer; and a first transmitting module for transmitting the printer driver to the client computer when the printer driver has not been installed in the client computer.

* * * * *